US008374914B2

(12) United States Patent
Valencia-Campo et al.

(10) Patent No.: US 8,374,914 B2
(45) Date of Patent: Feb. 12, 2013

(54) ADVERTISING USING IMAGE COMPARISON

(75) Inventors: Alexander Valencia-Campo, Moscow (RU); Mikhail Makalkin, Moscow (RU); Pavel Cherkashin, Moscow (RU)

(73) Assignee: Obschestvo S Ogranichennoi Otvetstvennostiu "Kuznetch", St. Petersburg (RU)

( * ) Notice: Subject to any disclaimer, the term of this patent is extended or adjusted under 35 U.S.C. 154(b) by 602 days.

(21) Appl. No.: 12/535,669

(22) Filed: Aug. 4, 2009

(65) Prior Publication Data
US 2010/0036883 A1 Feb. 11, 2010

Related U.S. Application Data

(60) Provisional application No. 61/086,760, filed on Aug. 6, 2008, provisional application No. 61/086,759, filed on Aug. 6, 2008.

(51) Int. Cl.
*G06Q 30/00* (2006.01)
(52) U.S. Cl. ............... 705/14.43; 382/218; 382/305; 707/3
(58) Field of Classification Search ............. 382/218, 382/305; 707/3; 705/14.43
See application file for complete search history.

(56) References Cited

U.S. PATENT DOCUMENTS

| | | | |
|---|---|---|---|
| 5,465,308 A | 11/1995 | Hutcheson et al. | |
| 5,911,139 A | 6/1999 | Jain et al. | |
| 6,122,628 A | 9/2000 | Castelli et al. | |
| 6,249,607 B1 | 6/2001 | Murakawa | |
| 6,256,409 B1 | 7/2001 | Wang | |
| 6,445,818 B1 | 9/2002 | Kim et al. | |
| 6,519,360 B1 | 2/2003 | Tanaka | |
| 6,556,710 B2 | 4/2003 | Pass et al. | |
| 6,563,959 B1 | 5/2003 | Troyanker | |
| 6,673,148 B2 | 1/2004 | Glavish et al. | |
| 6,721,449 B1 | 4/2004 | Krishnamachari | |
| 6,826,316 B2 | 11/2004 | Luo et al. | |
| 6,865,302 B2 | 3/2005 | Chang | |
| 6,952,495 B1 | 10/2005 | Lee et al. | |
| 2002/0042707 A1 | 4/2002 | Zhao et al. | |
| 2004/0047498 A1 | 3/2004 | Mulet-Parada et al. | |
| 2005/0041863 A1 | 2/2005 | Ray et al. | |
| 2006/0015492 A1* | 1/2006 | Keating et al. | 707/4 |
| 2007/0010990 A1 | 1/2007 | Woo | |

(Continued)

FOREIGN PATENT DOCUMENTS

| | | |
|---|---|---|
| RU | 2175148 C1 | 10/2001 |
| RU | 2259592 C2 | 8/2005 |
| RU | 2256224 C1 | 10/2005 |
| RU | 2304307 C1 | 10/2007 |

OTHER PUBLICATIONS

Ian Foster, et al., "The Anatomy of the Grid: Enabling Scalable Virtual Organizations," International J. Supercomputer Applications, 2001, 15(3).

(Continued)

*Primary Examiner* — Raquel Alvarez
(74) *Attorney, Agent, or Firm* — Patentbar International, P.C.

(57) ABSTRACT

Registration and classification of non-textual information, such as digital images and video is described. Image searching and comparison of the images is also described. The digital images are indexed (i.e., each image is assigned a unique numerical parameter and/or a plurality of numerical parameters). The resulting index files are stored in a database that can be quickly searched because the index files are universal numerical files that are significantly smaller in size than their source images. Image search queries are also indexed to generate an index file, which is then compared with the stored index files. A similarity score is also calculated to rank the similar images based on the index file-to-index file comparison.

32 Claims, 15 Drawing Sheets

U.S. PATENT DOCUMENTS

| | | |
|---|---|---|
| 2007/0078846 A1 | 4/2007 | Gulli et al. |
| 2007/0092142 A1 | 4/2007 | Kuriathungal et al. |
| 2007/0183633 A1 | 8/2007 | Hoffmann |
| 2007/0192292 A1 | 8/2007 | Imielinski |
| 2008/0177640 A1 | 7/2008 | Gokturk et al. |
| 2008/0221869 A1 | 9/2008 | Johnson et al. |
| 2009/0171766 A1* | 7/2009 | Schiff et al. ............ 705/10 |
| 2009/0172730 A1* | 7/2009 | Schiff et al. ............ 725/34 |
| 2010/0278439 A1* | 11/2010 | Lennington et al. ........ 382/209 |
| 2010/0329547 A1* | 12/2010 | Cavet ............ 382/164 |

OTHER PUBLICATIONS

Sergey Brin, et al., "The Anatomy of a Large-Scale Hypertextual Web Search Engine," Seventh International World-Wide Web Conference (WWW 1998), Apr. 14-18, 1998, Brisbane, Australia.

Charles E. Jacobs, et al, "Fast Multiresolution Image Querying," Proceedings of SIGGRAPH 95, Aug. 1995.

"Genetic algorithm," from Wikipedia http://en.wikipedia.org/wiki/Genetic_algorithm.

* cited by examiner

ADVERTISING USING IMAGE COMPARISON

PRIORITY

The present application claims priority to U.S. Provisional Application No. 61/086,760, filed Aug. 6, 2008, and entitled "METHOD FOR REGISTRATION AND SEARCH OF NON-TEXTUAL INFORMATION," and U.S. Provisional Application No. 61/086,759, filed Aug. 6, 2008, and entitled "METHOD FOR TARGETING ONLINE ADS IN THE CONTEXT OF VISUAL SEARCH RESULTS BY USER," the entireties of which are hereby incorporated by reference.

BACKGROUND

1. Field

The subject invention relates to advertising systems and methods of advertising using images and image-to-image comparison.

2. Related Art

Most websites today include digital images, such as digital photographs and videos. Most search engines include a feature that allows for searching of these digital images; however, these image search features use textual search queries that are compared with metadata for the digital images. Because some of the metadata is user generated, the metadata is sometimes inaccurate. Furthermore, some images have no metadata. Thus, the search results for the image search features tend to be unsatisfactory. In addition, the images are not ranked according to their level of similarity to the original query.

Content-based image retrieval (i.e., image-to-image comparisons) has been developed but has not been implemented in an online environment. Problems with the content-based image retrieval methods include the amount of time required to process the data and the accuracy of the comparison results. Some of the existing methods analyze the media content files (e.g., images, videos, etc.) for metadata to identify certain media patterns identical to those defined in preliminary descriptions, templates or objects (symbols, keywords, graphic patterns, audio phonemes). Some of these methods also recognize objects based on forms, contours, silhouettes, background, colors and other characteristics, or use graphical templates, such as "step", "edge", "roof", "mountain range" or "lawn," to recognize appropriate parts of the image. Other methods divide the image into logical units, apportion text and non-text areas, recognize objects, preliminarily allocate at least one graphical construction among smallest units as typical element for object recognition, and build object models as an aggregate of such typical elements with their spatial ratio. These methods, however, are limited to narrow domains (i.e., only recognition of text or simple geometric shapes). These methods also do not allow for classification, search and comparison of unknown objects, because the methods only work with the preliminarily defined types of objects and are limited to the components of the preliminary defined templates (e.g., phonemes for audio files, key frames for video files, graphical primitives for image files).

Other content-based image retrieval methods use file comparison algorithms. These methods find identical media-files, but do not analyze the content of these files. For example, some of these methods use fuzzy logic instruments that require significant computer resources and time and do not allow image searching of large arrays of data in real time. These methods are also limited in scalability because the time for search is linearly dependent on the number of files in the database.

Another method for identifying similar images develops a template based on a group of original images, using mathematical descriptors of forms and areas of the images in the group that are significant for search. The mathematical descriptors are developed based on parameters of the original image, which are compared with those in the database. A result is given as a number which is then compared with source parameters to determine the similarity of images. This method, however, still does not provide the speed of search necessary to conduct such searches in real time, because the descriptors for each group of initial images need to be changed every time a search is done, and the descriptor is then compared to all images in the database (i.e., calculate similarity parameters in the database and comparison of the source descriptor with them).

The most common method for indexing images is based on Fourier analysis. Fourier analysis gives quality results only based on contours of images. Attempts exist to improve search results using the results of Fourier analysis as input data for a neural network or by improving histograms of images by quantization based on frequency of color change. These attempts, however, have only been done for research purposes and only provide good search results in particular cases. The main problem with these approaches is the narrow domain of their potential use. For example, searches based on control points are used in face recognition systems to analyze images of human faces that have sufficient resolution and are in a particular perspective.

Other recognition methods separate images by their domain; then, different algorithms for mathematical descriptor calculation (index files) for the different domains are applied to the images to analyze the images. In other embodiments, a wide range of graphical primitives (knowledge base) are developed, and correlations between objects contained in a media file with the primitives in the database are determined. These methods, however, still do not identify the similarity of one media file to another because the methods can only be used with those media objects for which there are defined and reliable search algorithms and detailed databases of primitives. For example, because there are no reliable algorithms to search for trees, a search system using the known algorithms may identify a "tree" in the image, but cannot determine the similarity of the tree in the image to another tree. In addition, these methods have a high demand for processing computer resources to calculate the indexes of images.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

According to an aspect of the invention, a method is provided that includes maintaining an index of image index files, each image index file representative of a digital image of an advertisement; receiving an image query, the image query comprising a digital image; calculating an image index file representative of the digital image; comparing the image index file of the digital image with the image index files representative of the advertisements; transmitting at least one advertisement based on the comparison.

Comparing the image index file of the digital image with the index files representative of the advertisements may include generating a similarity score for each advertisement.

The method may further include creating a list of advertisements based on the comparison.

The method may further include transmitting the list of advertisements to a third party server, the third party server providing the digital images of the advertisements.

The method may further include transmitting a request for the at least one advertisement to a third party server, the third part server providing the digital image of the at least one advertisement.

The index may further include a representation of the digital image of the advertisement.

The digital image of the image query may be submitted by a user, and transmitting may include transmitting the at least one advertisement to the user.

The index may further include a monosemantic descriptor for each image index file and the method may further include calculating a monosemantic descriptor for the digital image and comparing the monosemantic descriptor for the digital image with the monosemantic descriptor for each image index file before comparing the image index files.

Calculating the monosemantic descriptor may include dividing the digital image into a plurality of cells; calculating an image descriptor for each of the plurality of cells; and aligning the image descriptor for each of the plurality of cells to calculate the monosemantic descriptor.

The image index file may include a plurality of metrics.

The plurality of metrics may be clustered according to a color palette of the digital image, changes in image composition of the digital image and generic representation of the digital image.

The plurality of metrics may include color metrics, texture metrics, intensity metrics and morphology metrics.

The plurality of metrics may include a 2D color histogram and a 4D color vector field.

Comparing may include calculating the similarity for each of the image metrics and summing the similarity to generate a similarity score.

Comparing may include calculating the similarity for each of the image metrics, multiplying each of the similarities by a weighting factor, and summing the weighted similarities to generate an image similarity score.

According to another aspect of the invention, a method is provided that includes maintaining an index of image descriptors, each image descriptor representative of a digital advertisement; receiving a user selection of a digital image; calculating an image descriptor representative of the digital image; comparing the image descriptor of the digital image with the image descriptors representative of the digital advertisements; transmitting at least a link to a webpage based on the comparison.

The user selection may include a request to access a web page on which the digital image is located.

The user selection may be a mouse-over of the digital image.

The user selection may be a click-through of the digital image.

Comparing may include generating a similarity score and wherein the link transmitted is based on the similarity score.

The index may further include a monosemantic descriptor for each image index file and the method may further include calculating a monosemantic descriptor for the digital image and comparing the monosemantic descriptor for the digital image with the monosemantic descriptor for each image index file before comparing the image index files.

Calculating the monosemantic descriptor may include dividing the digital image into a plurality of cells; calculating an image descriptor for each of the plurality of cells; and aligning the image descriptor for each of the plurality of cells to calculate the monosemantic descriptor.

The image index file may include a plurality of metrics.

The plurality of metrics may be clustered according to a color palette of the digital image, changes in image composition of the digital image and generic representation of the digital image.

The plurality of metrics may include color metrics, texture metrics, intensity metrics and morphology metrics.

The plurality of metrics may include a 2D color histogram and a 4D color vector field.

The method may further include in response to the user selection of the digital image, present the user with one or more referrals selected from the group consisting of purchasing the camera that took the digital image, buying a product or service from the source of the image, buying something related to the image, and getting more information about the image or the source of the image; receiving a user selection of one of the referrals; and transmitting at least the link to the webpage based on the similarity score and based on the selected referral type.

Transmitting at least a link to a webpage based on the similarity score may further include transmitting the digital advertisement.

The method may further include transmitting a request for the digital advertisement to a third party server, the third part server providing the digital image of the advertisement.

According to a further aspect of the invention, a computer system is provided that includes an index data store comprising a plurality of image index files representative of digital advertisements; a search portal to receive a digital image; and an indexing engine to calculate the image index files for each digital advertisement, calculate an image index file for the digital image and compare the image index file for the digital image with the plurality of image index files representative of digital advertisements.

The computer system may further include an advertisement data store to store the digital advertisements corresponding to the image index files in the index data store.

The search portal may be configured to transmit at least one of the digital advertisements in the advertisement data store based on the comparison by the indexing engine.

The search portal may further include a user interface.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Embodiments of the invention relate to systems and methods for indexing, registration, classification and search of non-textual information, such as digital images and video (hereinafter "images"). The digital images are indexed (i.e., each image is assigned a unique numerical parameter) to identify and characterize the content of the image. The resulting index files are stored in a database and can be quickly searched because the index files are universal numerical files that are significantly smaller in size than their source images. The index files may also include link(s) to the original image.

Embodiments of the invention also relate to systems and methods for comparison, searching and ranking of images. An image query is first indexed as described above to generate an image query index file. The image query index file is then compared with the index files stored in a database. A similarity score is calculated using the comparison of the index files and is used to rank the similar images.

Advantages of the above systems and methods include universality (i.e., classification of arbitrary images as well as objects that they contain); mathematical unambiguity (i.e., creates a monosemantic descriptor, index file, for further search of similar images); location of similar images and definition of the level of similarity among the images; and, scalability and high speed of search (e.g., the algorithm can be used to build an index of all available images on large networks such as the Internet and search for similar images in real time). In addition, the algorithm is not affected by modifications to the image, such as a change of color, contrast, small shifts and turns of the image, distortion to image, certain changes to perspective, etc.

Figure 1:
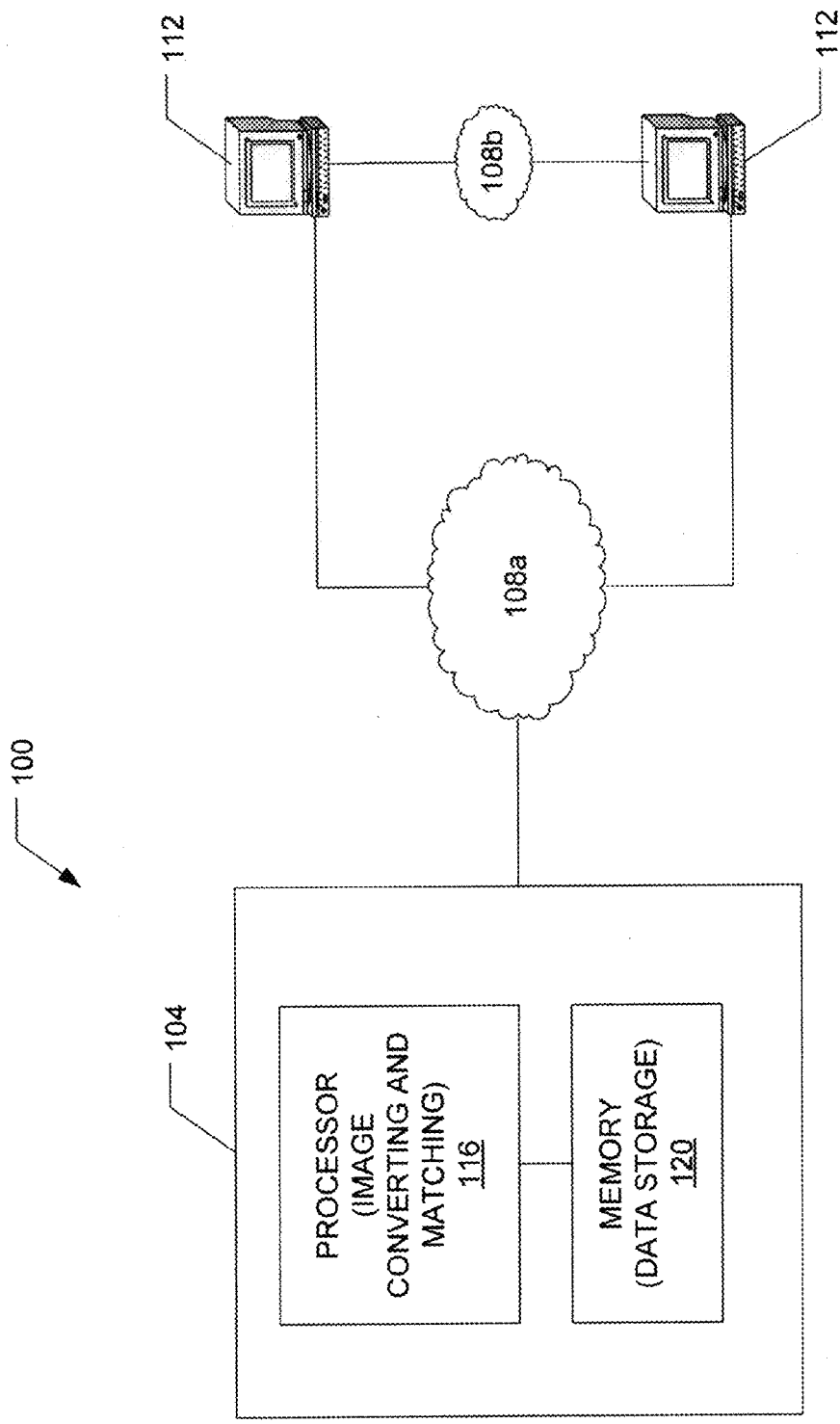
FIG. 1 is a block diagram of a image searching system in accordance with one embodiment of the invention.

An embodiment of the invention will now be described in detail with reference to FIG. 1. FIG. 1 illustrates an exemplary system 100 for image recognition, classification, comparison and searching. The system 100 includes a server 104 that may communicate with computers 112 through a network 108 (108*a*, 108*b*).

The server 104 is configured to receive requests from computers 112, process the requests and provide responses to the computers 112. In addition, the server 104 is configured to send requests to the computers 112. The server 104 may include one or more server computers networked to one another. An exemplary server is the Apache server. The server 104 includes a processor 116 to execute instructions, which is connected to memory 120 that stores data. The processor 116 executes instructions and accesses data in the memory 120 to, for example, index the images and search for similar images using the index files. It will be appreciated that the server 104 may be implemented with any type of hardware and software, and that the server 104 may have a different configuration than shown in FIG. 1. In addition, it will be appreciated that the server 104 may include several server computers connected together.

The network 108 may be any type of communications channel, a local area network (LAN), a wide area network (WAN), such as the Internet, direct computer connections, and the like. The connection may be accomplished in a wireless manner using radio frequency, infrared, or other technologies, using any type of communication hardware and protocols, through other communication mediums, such as electric cable, fiber optic cable, and/or through other technologies.

The computers 112 access the server 104 through the network 108*a*. The computers 112 may also communicate with one another over the network 108*b*. The computer 112 may be a server, a personal computer, a portable computer, a hand held device, a wireless device, and the like. The computer may be a single device at a single location or multiple devices at a single or multiple locations that are connected together using an appropriate communication protocol over any communication medium.

In one embodiment, the server 104 identifies an image search result in response to image input received from any of the computers 112 and shares the search result with users located at that computer 112 over the network 108*a*. For example, the server 104 may include a website that is accessible by the computer 112 through a web browser located at the computer 112 over the network 108*a*. The website allows the user to enter an image query at the computer 112.

Figure 2:
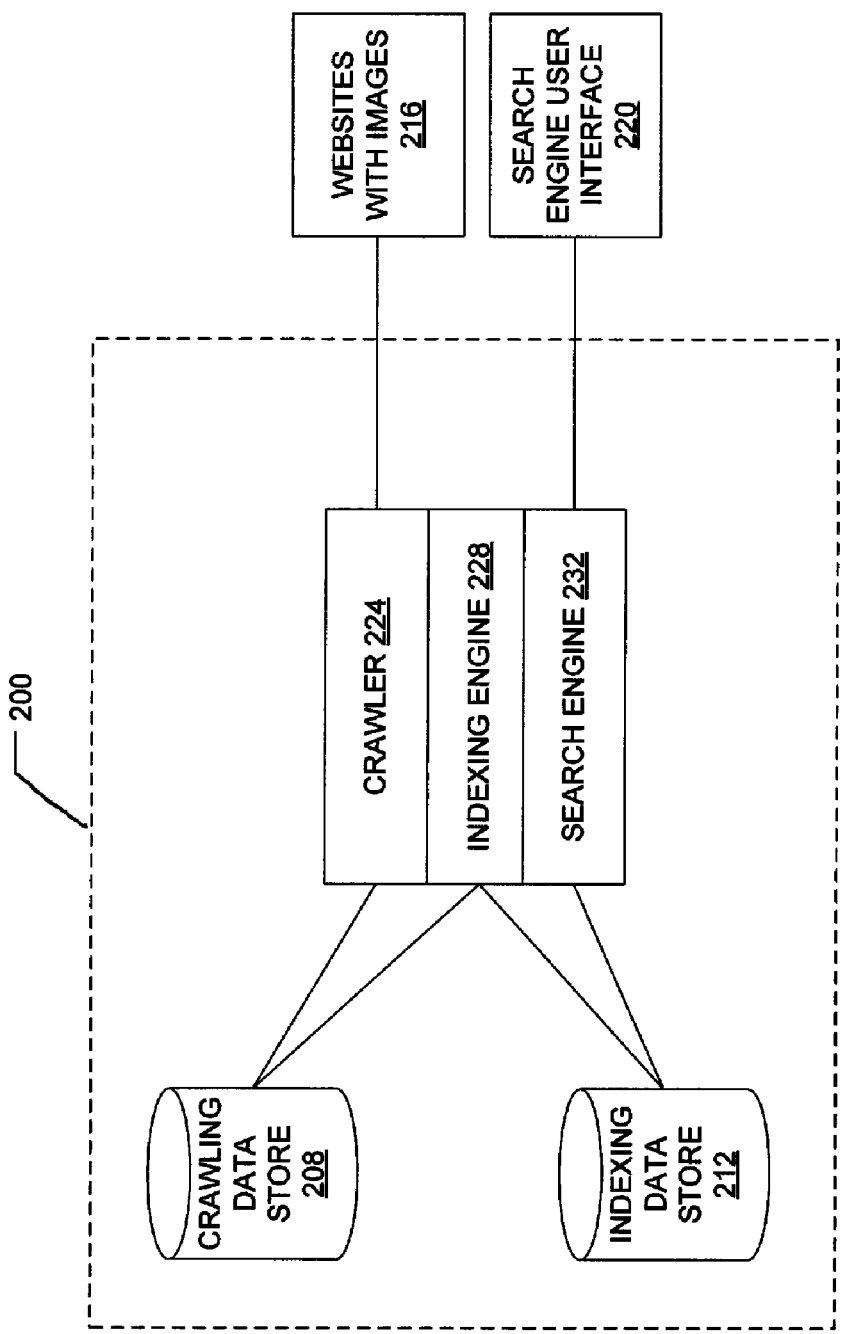
FIG. 2 is a block diagram of an image search system in accordance with one embodiment of the invention.

FIG. 2 illustrates a search system 200 according to an embodiment of the invention. The search system 200 includes a search server 204, a crawling data store 208 and an indexing data store 212. The search system 200 accesses websites with images 216. The search system 200 is also connected to a search engine user interface 220. The search server 204 includes a crawler 224, an indexing engine 228 and a search engine 232.

The crawling data store 208 and indexing data store 212 are storage media, e.g., storage area network (SAN), network attached storage (NAS) that may utilize volatile or non-volatile memory that includes, for example, read only memory (ROM), random access memory (RAM), magnetic disk storage media, optical storage media, flash memory devices and zip drives.

The crawler 224 is a software program or software robot, which is typically used to build lists of the information found on Web sites. Another common term for the crawler 224 is a spider. The crawler 224 typically keeps track of the information located in its search and where the information is found. In particular, the crawler 224 is configured to extract the images from websites 216. In one embodiment, the crawler 224 is a universal crawler that is a program working on one or several servers of the system and going through hyperlinks of files in documents, published on the internet, searching for required information (for example, images or other media files). Examples of crawlers include Googlebot, Yahoo!

Slurp, MSN Crawler and others. The crawler 224 forms an array of links to images for subsequent indexing and builds links for further crawling. The images located by the crawler 224 are stored temporarily in the crawling data store 208. For example, the images may be stored in the crawling data store 208 until the indexing process is completed.

The indexing engine 228 is typically a software program which is used to create an index, which is then stored in the indexing data store 212. The index is typically a table of alphanumeric terms that define the images located by the crawler 224 and the location of documents corresponding to the alphanumeric terms (e.g., a link). The link may be a Uniform Resource Locator (URL). The indexing engine 228 may build a hash table, in which numerical values are attached to the images. In particular, the indexing engine 228 is configured to analyze the images in the crawling data store 208 to generate an index file which is stored in the indexing data store 212. For example, the indexing engine 228 may be configured to generate an index file as described below with reference to FIGS. 3-7. The indexing engine 228 may also be configured to cluster the image index files that are representative of similar images as described below with reference to FIGS. 3-7.

In one embodiment, the indexing engine 228 is also configured to receive an image query, index the image query and compare the index file of the image query with the index files stored in the indexing data store 212. The indexing engine 228 may also be configured to determine a level of similarity between the image query and the images having index files in the indexing data store 212.

The search engine 232 is configured to receive image queries from the search engine user interface 220 and transmit search results from the indexing engine 228 to the user interface 220. In one embodiment, the search engine 232 provides the image query to the indexing engine 228 for indexing and comparison; in another embodiment, the search engine 232 performs the indexing and comparison; and, in other embodiments, the indexing engine 228 performs the indexing and the search engine 232 performs the comparison. The search engine 232 may also be configured to generate a web page with a list of images ranked according to the calculated level of similarity.

Figure 3:
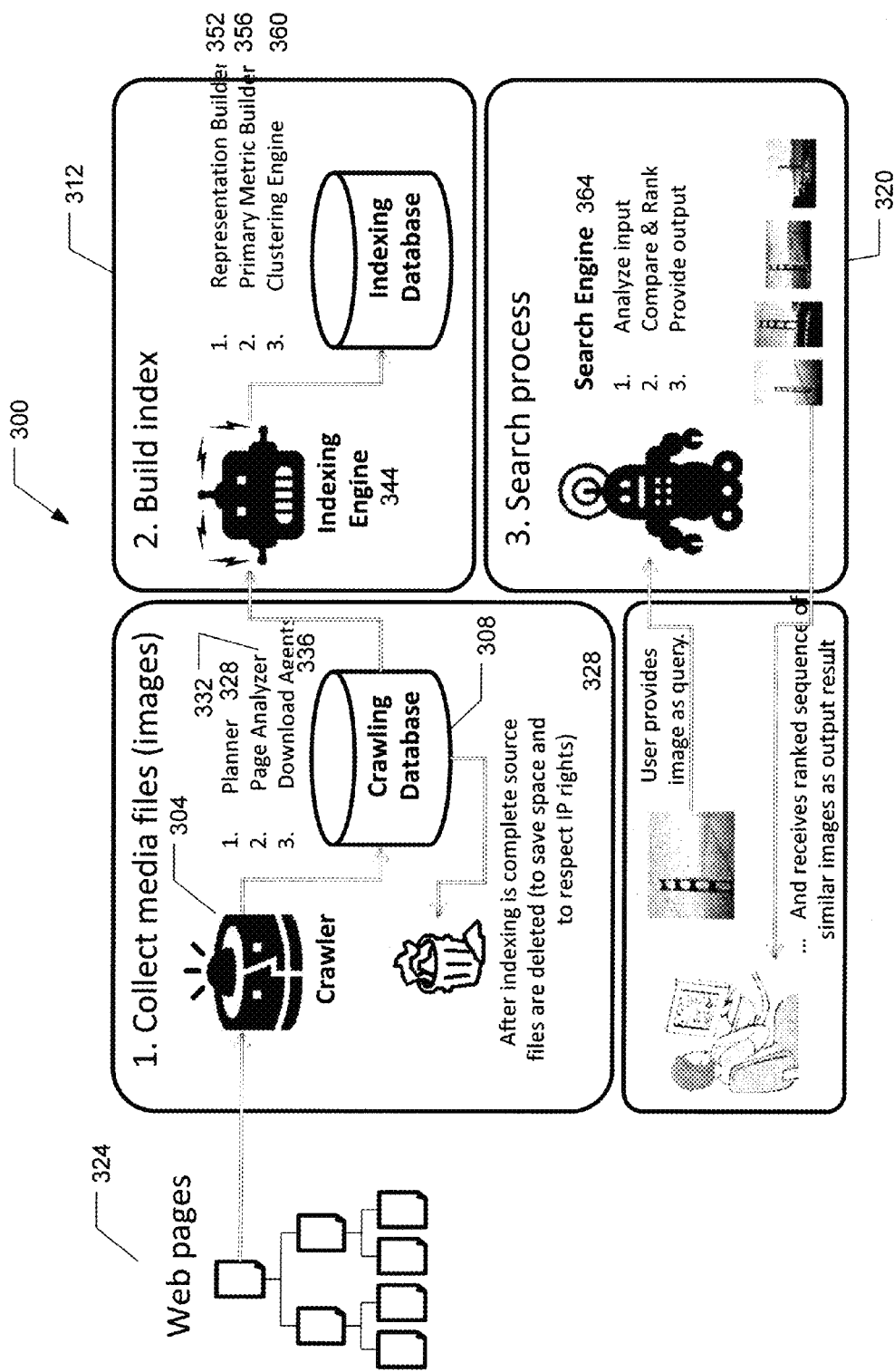
FIG. 3 is a detailed block and flow diagram of the image search system in accordance with one embodiment of the invention.

FIG. 3 illustrates the search system and a process for crawling, indexing and searching using the search system 300. The system 300 includes a crawler 304 (e.g., a general search crawler and/or specialized crawlers that may be dedicated to a specific type of data, portal, source of data, etc), a crawling database 308, an indexing sub-system 312, an indexing database 316 and a search portal 320.

As shown in FIG. 3, the method includes using the crawler 304 to collect images from the web pages 324. The crawler 304 is configured to download the image from its host server and save the image, the image metadata and a thumbnail of the image in the crawling database. The crawler may be, for example, a universal data crawler, a specialized software program-agent for performing a certain defined search algorithm, etc. Specialized crawlers use specific characteristics of application interfaces of various portals, photo banks, and other data sources to locate the images. The crawler 304 may be scalable and may have a distributed architecture.

The crawler 304 may include a planner 328, page analyzer 332 and download agents 336. The crawler 304 may include multiple download agents 336 that are launched and working at the same time; typically, only one instance of planner 328 is working at a given time, however, additional copies may be provided. The planner 328 defines strategies for site visits and includes a planner database that contains information about tasks for crawling and their status, and a queue for crawling the tasks defined by the planner 328. The page analyzer 332 selects links of downloaded pages, and stores data about each site, the images on the site and their status in the crawling database 308.

The download agents 336 take tasks from the planner queue and download the images from the web pages. In one embodiment, the download agents 336 use an application programming interface (API) provided by an existing large media archive or specialized online service to download the images. The download agents 336 typically save additional meta-data about the images, such as the URL of the file, the URL of the containing page, the date/time created, the date/time downloaded, etc. The download agents 336 may also create and save a thumbnail of the image (e.g., about 128×128 pixels in size). After the indexing subsystem 312 completes processing of the images, the source files in the crawling database 308 are deleted 340.

The indexing sub-system 312 builds an index from the images in the crawling database 308. The indexing sub-system may be scalable (e.g., by adding additional servers) and may have a distributed architecture. The indexing sub-system 312 stores the indexed image files and may also include image thumbnails and search indexes. The indexing sub-system 312 includes an indexing engine 344 that selects images from the crawling database 308, saves the metadata and thumbnail of the image in an indexing database 316, indexes the image, optionally analyzes the image and deletes the original image from the crawling database 308.

The indexing engine 344 may include a representation builder 352, a primary metric builder 356 and a clustering engine 360. The representation builder 352 normalizes the original image, scales the image and transforms the image into a generic image format. The representation of the original image is typically about 128×128 pixels in size; it will be appreciated, however, that the representation may be less than or greater than 128×128 pixels in size.

The primary metric builder 356 indexes the original image by analyzing the image in accordance with one or more mathematical models. The analysis with the mathematical model(s) calculates several metrics that numerically define various aspects of the image, such as, for example, color, intensity, texture, shapes and the like. The metrics may be calculated using both the original image and the representation of the image, only the original image or only the representation of the image. Examples of the types of metrics that may define the image include morphology, graininess, vertical lines, horizontal lines, curves, color, intensity and the like. The algorithms for calculating the metrics include, for example, 2D color histogram algorithms, 4D color vector field algorithms, and so on.

The index file includes a plurality of metrics that define aspects of the image. In one embodiment, the index file includes any value or range of values between about 129 and 135 metrics. For example, the index file may include about 132 different metrics. It will be appreciated that the index file may include less than 129 metrics or more than 135 metrics.

Depending on the desired accuracy of the algorithm, the size of the metrics may be any value or range of values between about 1 and 128 bits. It will be appreciated, however, that the size of the metrics may be larger than 128 bits.

The calculated metrics are stored in an index file, which is stored in the indexing database. In one embodiment, the index file is about 1.3 kb in size. It will be appreciated that the index file may be less than 1.3 kb in size or greater than 1.3 kb. For example, the index file together with metadata and the representation of the image may be about 8-50 kb in size. Searching of the index files is significantly faster than existing image comparison algorithms.

The index file that includes the plurality of metrics can be clustered based on the type of clusters. For example, the index file may include a cluster of metrics that define the texture of the image, a cluster of metrics that define the intensity of the image; a cluster of metrics that define the color of the image; a cluster of metrics that define shapes in the image; a cluster of metrics that register a changed color palette (e.g., change from color image to black and white, or negative image); a cluster of metrics that register minor changes to image composition (e.g., change of point of view for same object or landscape, cropped images, etc); clusters of metrics that register a more generic image (e.g., if the original picture is a photo of a person standing in front of a landscape, a more generic image is the landscape without the person).

The images may also be analyzed to account for changes to the original image (e.g., flipping or rotating image). A metric for the changes to the original image may also be stored in the index file. Alternatively, the indexing subsystem may calculate the metrics for the image without the changes.

The indexing engine 344 may also recursively decompose the image into its components. Each of the components may then be analyzed and indexed in the same way as the image as whole (e.g., 132 metrics are calculated for each component of the image). The index file for the image components may be stored as part of the index file as the image (e.g., a cluster of metrics for each component of the image) or may be stored as separate image files.

When the indexing engine 344 analyzes digital videos, the indexing subsystem may analyze each frame of the video; however, it will be appreciated that selecting one or some of frames of the video for indexing may be sufficient for comparison. For example, the indexing engine 344 may select one out of every 50 frames to index or one out of every 100 frames, and so on.

The index files in the indexing database 316 may also be clustered by the clustering engine 360. The clustering engine 360 identifies image index files that are representative of similar images and clusters those index files together. In one embodiment, a formula is applied to the index files in the indexing database 316 that calculates a similarity score. Images that satisfy a threshold level of similarity are added to the same cluster. An exemplary formula for calculating similarity is described below with reference to FIG. 10. It will be appreciated that other methods for clustering the images may be used as known in the art.

The clustered index files may be stored in separate databases or in the same database. Each cluster is identified by a cluster value. The cluster value may be an index file representative of the cluster, a unique numerical cluster identifier, a range of index file values in the cluster, etc.

The search portal 320 receives search queries from users and provides search results to the users. The search portal 320 includes a search engine 364 that analyzes the input image, compares the input image to the images indexed in the indexing database 316, ranks the images and provides an output. In one embodiment, the output is a ranked sequence of similar images.

A user can provide the input image by, for example, uploading the image through a web form; providing a URL where the image is located; using a browser plug-in or widget that provides the user with an option to select any image in the browser and select a "Find Similar" function; using a system agent or computer widget that looks for specific images online (e.g., a widget that controls the use of intellectual property rights for a user-specified image); using a dedicated function on a third-party portal or online service that provides access to the search functionality of the system based on user-selected images on that portal, and the like. The user may also specify additional characteristics for search, such as color, image histogram, level of similarity, meta-tags, number of resulting images, and the like.

The query image is then analyzed to generate an index file for the query image using the indexing process described above. In one embodiment, the search portal 320 transmits the query image to the indexing engine 312 to generate the query image index file. Alternatively, the search portal 320 may generate the query image index file for the query image using the same analysis as the indexing engine 312.

The query image index file is then compared with the index files stored in the indexing database 316. For example, the indexing engine 312 or the search engine 364 may generate an SQL request of the indexing database 316. In embodiments in which the index files are clustered, a cluster to search is first identified and then the query image index file is compared only to the images in that cluster. In embodiments in which the index files are not clustered, the query image index file is compared to all of the index files in the indexing database 316. The query image index file is then compared with the index files using one or more mathematical models that generate a scalar value defining the level of similarity between the images, as described below with reference to FIG. 10. The images can then be sorted and/or ranked using this value.

In one embodiment, the search portal 320 automatically generates a web page that lists the images by providing the thumbnail of the images, ranked according to the score that defines the level of similarity. For example, the image that has the highest level of similarity is presented at the top of the web page, followed by other similar images in descending order based on the score.

The web page is then provided to the user as search result. Users can select a thumbnail from the web page to link to the original source page of the image, or may continue searching to find images similar to those found in the search results. It will be appreciated that the search portal 320 may provide the search results in a variety of different manners. For example, the search portal 320 may link the user directly to the source page of the image that has the highest similarity score.

Figure 4:
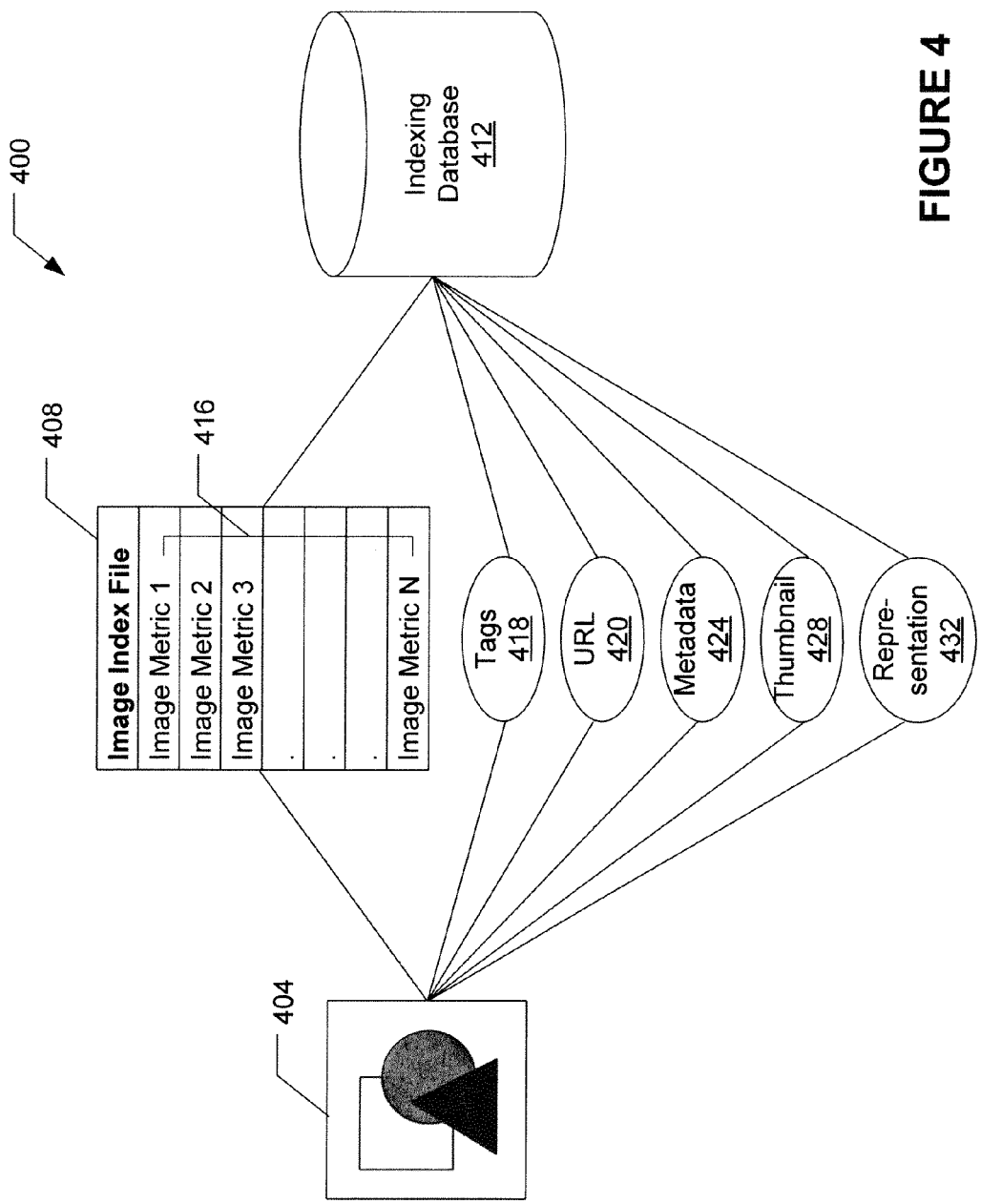
FIG. 4 is a schematic view of indexing an image in accordance with one embodiment of the invention.

FIG. 4 illustrates a process for generating the index file 400 in further detail, according to one embodiment of the invention. It will be appreciated that the process 400 described below is merely exemplary and may include a fewer or greater number of steps, and that the order of at least some of the steps may vary from that described below.

As described above, an image 404 is converted into an index image file 408, which is stored in the indexing database 412. The index image file 408 includes a plurality of image metrics 416. For example, the number of image metrics 416 in the image index file 408 may be any value or range of values between about 129 and 135 metrics. It will be appreciated that the number of metrics may be less than 129 metrics or greater than 135 metrics. The image metrics 416 define various aspects of the image numerically, such as, for example, color, intensity, texture, shapes and the like.

In one embodiment, the index image file 408 is a hash table. The image metrics 416 may be calculated from the original image or the representation of the image. The image metrics 416 in the index image file 408 may be clustered based on the type of metric. For example, the color metrics may be grouped together, the texture metrics may be grouped together and so on.

The image index file 408 may also include or may be stored with tags 418, a URL 420, metadata 424, a thumbnail 428 and the representation of the original image 432. The tags 418 are user-defined metadata that typically identify the subject of the image 404. For example, if the image is a photograph of a beach in Costa Rica, the tags may include one or more of beach, Costa Rica, vacation, Pacific Ocean, rainforest, and so on. The URL 420 identifies the webpage where the original image is located. The URL 420 may include two URLs, one identifying the webpage where the original image is located and another to the image itself. The metadata 424 includes additional information about the image 404, such as, for example, the camera used to take the picture, the date the picture, and the like. The thumbnail 428 is a smaller version of the image 404 and the representation of the original image 432 is a smaller version of the image 404 that has been adjusted to scale, image file type, and the like. The thumbnail 428 and representation of the original image 432 are typically both about 128×128 pixels in size.

The resulting image index file 408 is about 1.3 kb in size in one particular embodiment. It will be appreciated that the image index file 408 may be smaller than 1.3 kb or greater than 1.3 kb. For example, the image index file 408 may be about 1 kb-50 kb. Because the image index file 408 is small, the time to perform image search and comparison algorithms is significantly faster than existing image search algorithms.

Figure 5:
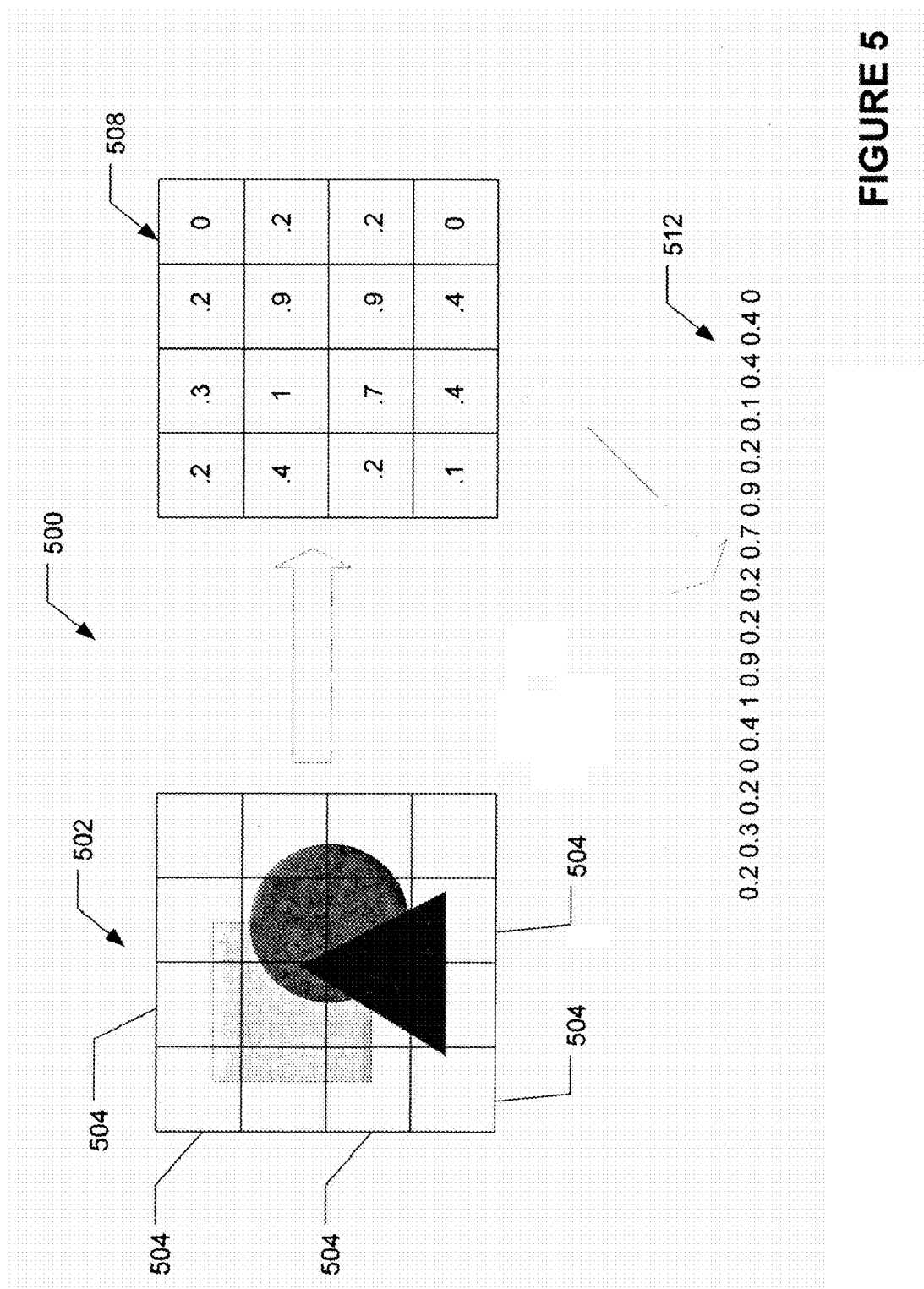
FIG. 5 is a schematic view of generating an index file in accordance with one embodiment of the invention.

FIG. 5 illustrates a process for calculating each image metric and/or calculating a clustering metric 500 in further detail, according to one embodiment of the invention. It will be appreciated that the process 500 described below is merely exemplary and may include a fewer or greater number of steps, and that the order of at least some of the steps may vary from that described below.

An image 502 to be indexed is first divided into a plurality of cells 504. For example, the image 502 is divided into sixteen (16) cells, as shown in FIG. 5. It will be appreciated that the image may be divided into fewer than sixteen or more than sixteen cells.

A cellular image metric 508 is then calculated for each cell 504. For example, each image metric described above with reference to FIG. 6 is calculated for each cell 504 (e.g., each of the color metrics, each of the intensity metrics, each of the texture metrics, each of the shape metrics, etc.).

FIG. 5 illustrates a simplified example of calculating the image metric for each cell 504 for a shape metric. As shown in FIG. 5, a scalar value is assigned to each cell 504. The scalar value defines numerically the amount of space that includes a shape, such as an image object (e.g., 0 for cells with no image object, 1 for cells that includes an image objects, or a fraction corresponding to the fraction of the cell that contains an image object that have a portion of an image object). It will be appreciated that the metric values will vary from that shown for each metric type and for each non-identical image.

The cellular image metrics 508 for each of the cells are then aligned into the overall image metric 512. For example, for the image 502 that is divided into sixteen cells 504, the image metric 512 includes sixteen cellular image metrics 508 that are aligned with one another.

The overall image metric 512 may then be converted into a binary number. For example, all of the numerical values in 512 may be aligned together to generate a single binary number.

The process described above and shown in FIG. 5 is then repeated to generate each of the metrics in the image index file (e.g., 132 metrics). It will be appreciated that in some embodiments, some of the metrics may be calculated for the image as a whole (as opposed to calculating cellular image metrics 508 and then generating the image metric 512).

The process shown in FIG. 5 may also or alternatively be used to calculate a clustering metric. The clustering metric of each image would then be compared to identify similar images for clustering.

Figure 6:
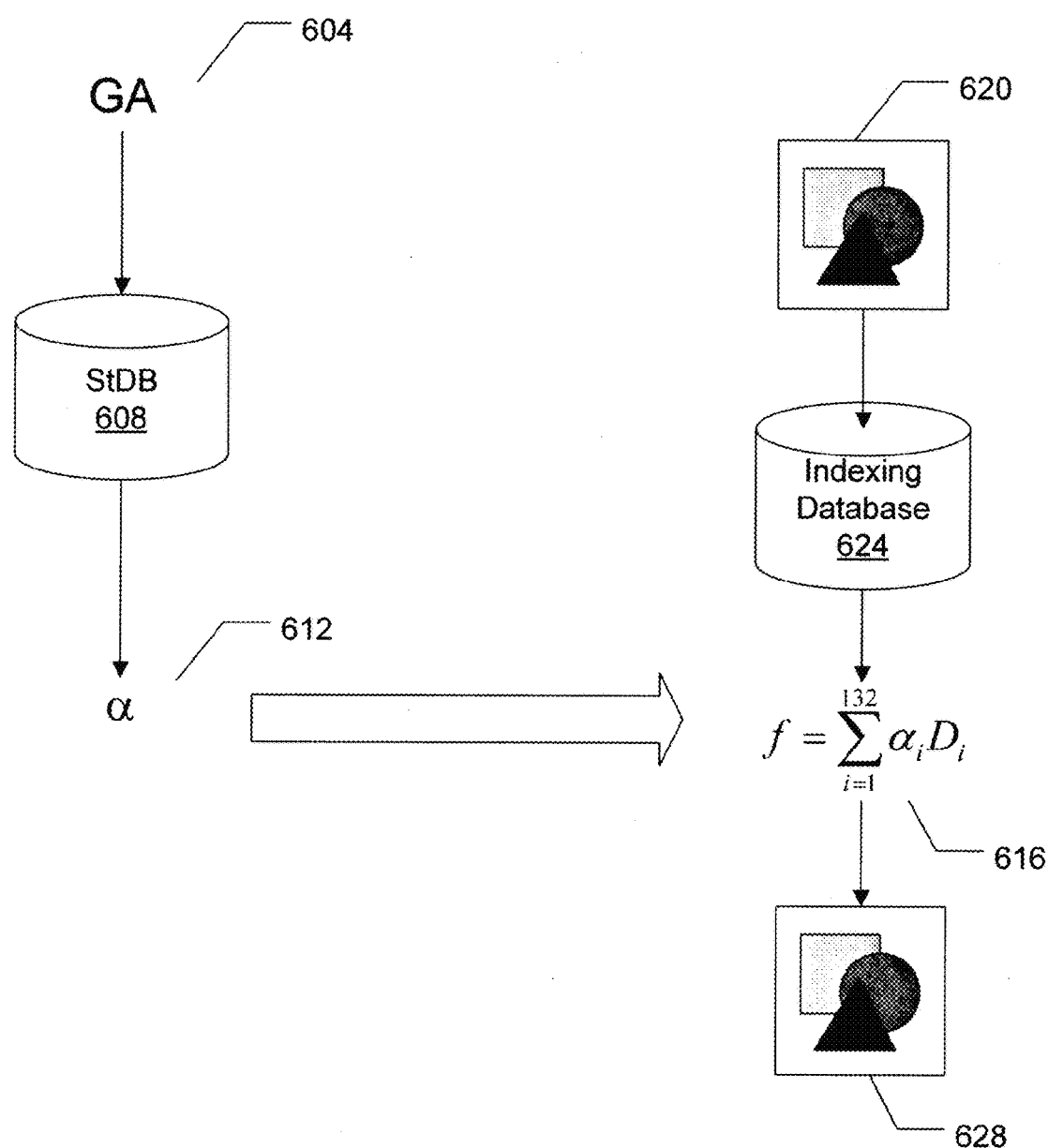
FIG. 6 is a schematic view of image searching in accordance with one embodiment of the invention.

FIG. 6 illustrates a process 600 for calculating the similarity of images according to one embodiment of the invention. The process 600 shown in FIG. 6 may be used to identify a cluster for further searching and/or to identify the similarity of images. It will be appreciated that the process 600 described below is merely exemplary and may include a fewer or greater number of steps, and that the order of at least some of the steps may vary from that described below.

Calculating similarity of images is generally done by comparing all of the image metrics for both pictures. Two images having identical metrics are said to be identical. When the metrics differ, the amount of variance indicates the degree of difference between the images. As noted above, each image metric 512 relates to a certain property of the images. According to an embodiment of the invention, each metric 512 is assigned a weighting factor ($\alpha$) relating to its importance. The assignment may be static of dynamic. It may done by a user (e.g., an administrator), or calculated automatically using various functions. In the following description, an automatic function is provided to dynamically assign the weighting factor.

A genetic algorithm (GA) 604 is applied to a standard database (StDB) 608 to generate a weighting factor ($\alpha$) 612 for each metric. The weighting factor ($\alpha$) 612 is then used to calculate the similarity of the image using the following function 616:

$$f = \sum_{i=1}^{132} \alpha_i D_i$$

wherein $\alpha_i$ is the weighting factor for each metric in the index file and $D_i$ is the difference between each metric value in the image query index file and the index file in the database. For example, the image metric 512 that includes the scalar values of each cell of the image query index file may be subtracted from the image metric 512 that includes the scalar values of each cell of the image index file in the database to generate the difference $D_i$; in another example, the single number binary conversions of the image metrics 512 are subtracted to generate the difference $D_i$. The function 616 applies each weighting factor 612 to the difference $D_i$ between the image query and the indexed image for each metric, and then adds each of those values together.

In one embodiment, the function 616 results in a normalized scalar value that is between 0 and 1 for each image. Thus, for each input image 620, the function 616 calculates the similarity between the input image 620 to each image in the indexing database 624 to calculate a value 620. At least the image 628 corresponding to the highest value 620 is presented to the user. Typically, however, a list of images ranked according to the value 620 is presented to the user.

Figure 7:
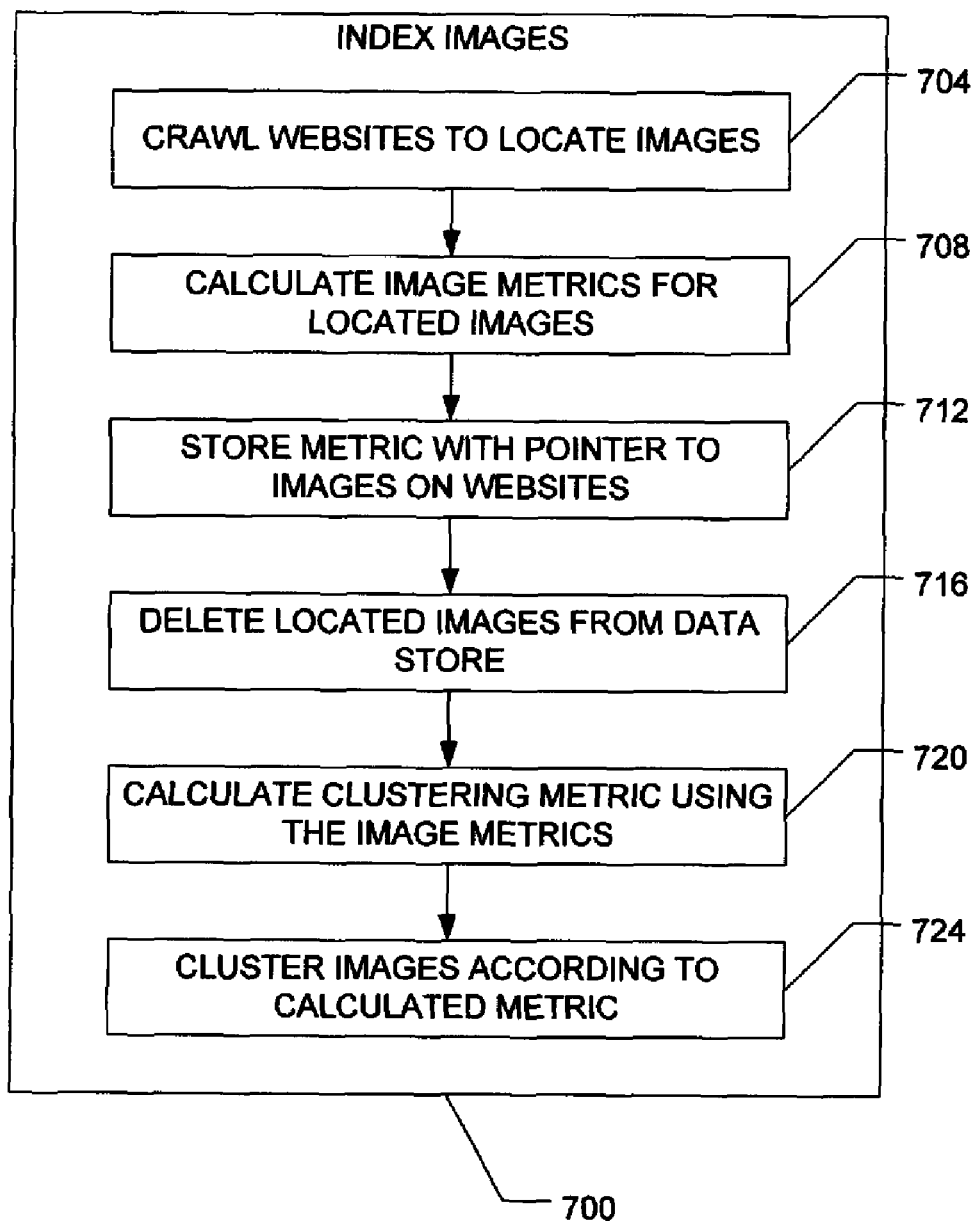
FIG. 7 is a flow diagram of a process for indexing images in accordance with one embodiment of the invention.

FIG. 7 illustrates the process for indexing images 700 in further detail, according to one embodiment of the invention. It will be appreciated that the process 700 described below is merely exemplary and may include a fewer or greater number of steps, and that the order of at least some of the steps may vary from that described below.

The process 700 begins by crawling websites to locate images (block 704). For example, the crawler 224 of FIG. 2 may scan websites 216 for images, download the images and store the images and optionally metadata associated with the image in the crawling data store 208.

With reference back to FIG. 7, the process 700 continues by calculating image metrics for located images (block 708) and storing the metrics with links to the images on websites (block 712). For example, several metrics that define various aspects of the image, such as the color, intensity, texture, shapes and the like may be calculated and stored with a link (e.g., URL) to the webpage where the original image is located in a indexing data store (e.g., indexing data store 212 of FIG. 2).

The process 700 continues by deleting the located images from the data store (block 716). For example, the images stored in the crawling data store 208 are deleted.

Referring again to FIG. 7, the process 700 continues by calculating a clustering metric using the image metrics (block 720) and clustering the images according to the calculated metric (block 724). In one embodiment, the clustering metric is a scalar value that defines a similarity of the images within the cluster. For example, the similarity formula described above may be used to identify images that satisfy a threshold similarity level for that cluster. In another embodiment, the clustering metric is a range of values that correspond to the index files in the cluster, which are identified based on a similarity function. In another embodiment, the clustering metric is a representative index file for the index files in the cluster, which is identified based on a similarity function. In another embodiment, a unique clustering value is calculated using one or more (or all) of the metrics in the index file for each image.

Figure 8:
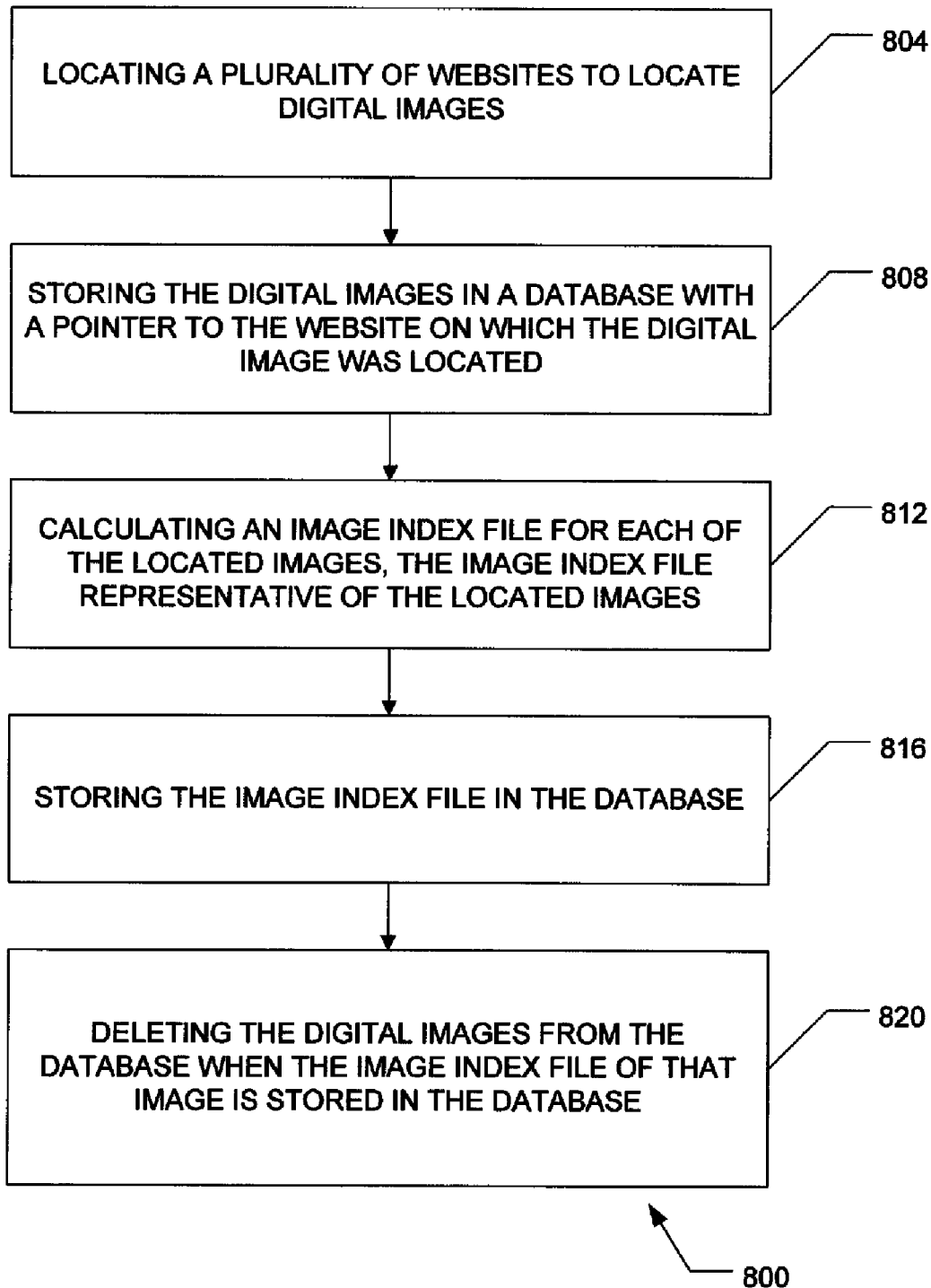
FIG. 8 is a detailed flow diagram of a process for indexing images in accordance with one embodiment of the invention.

FIG. 8 illustrates a process for indexing images 800 in further detail, according to another embodiment of the invention. It will be appreciated that the process 800 described below is merely exemplary and may include a fewer or greater number of steps, and that the order of at least some of the steps may vary from that described below.

The process 800 begins by locating a plurality of websites to locate digital images (block 804). The process continues by storing the digital images in a database with a link to the website on which the digital image was located (block 808). For example, the crawler 224 of FIG. 2 may scan websites 216 for images, download the images and store the images and optionally metadata associated with the image in the crawling data store 208.

The process 800 continues by calculating an image index file for each of the located images, the image index file representative of the located images (block 812) and storing the image index file in the database (block 816). The process 800 continues by deleting the digital images from the database when the image index file of that image is stored in the database (block 820). For example, several metrics that define various aspects of the image, such as the color, intensity, texture, shapes and the like may be calculated and stored with a link (e.g., URL) to the webpage where the original image is located in a indexing data store (e.g., indexing data store 212 of FIG. 2), and the original image is deleted from the crawling data store 208.

Figure 9:
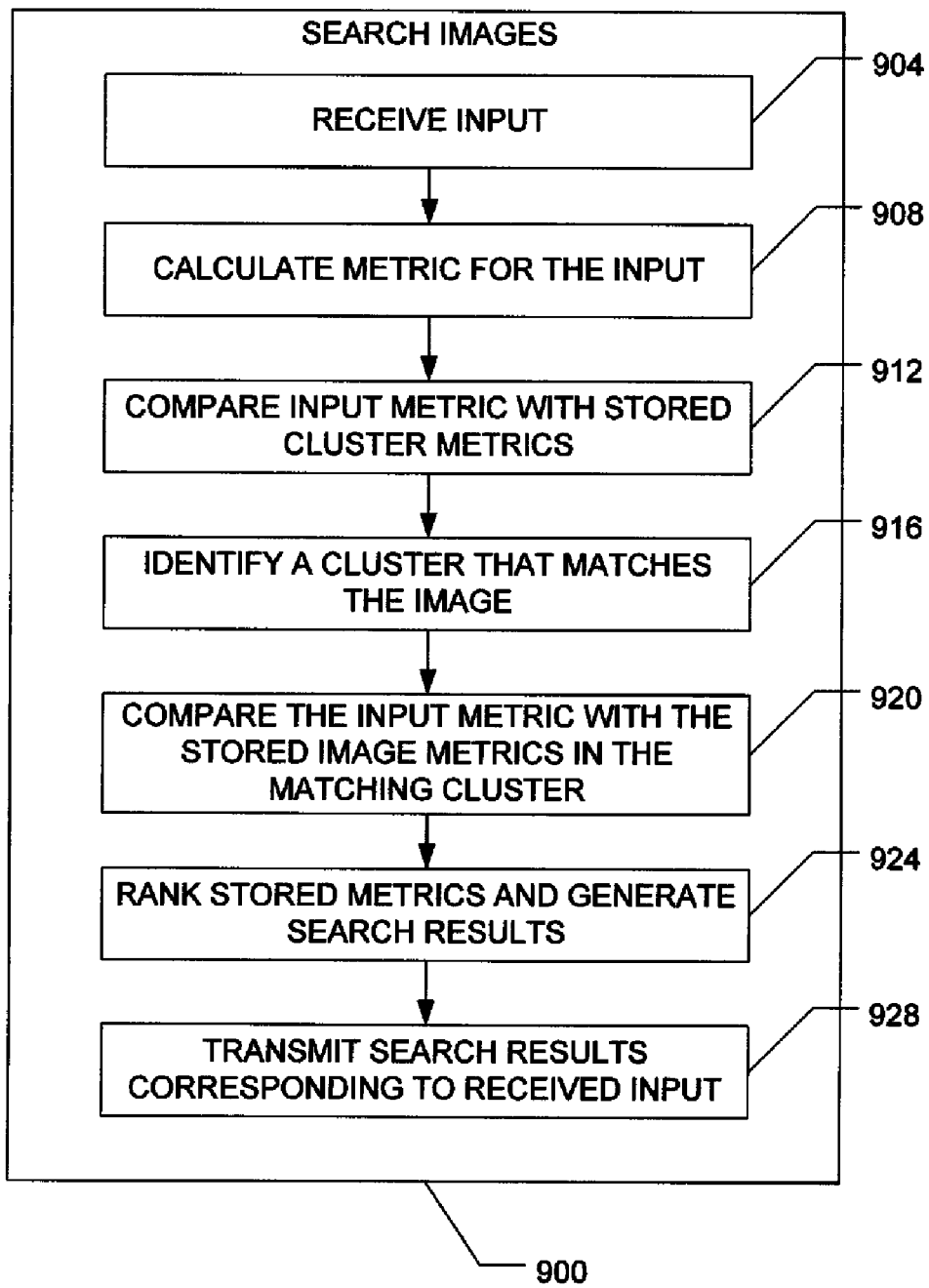
FIG. 9 is a flow diagram of a process for image searching in accordance with one embodiment of the invention.

FIG. 9 illustrates a search process 900 according to one embodiment of the invention. It will be appreciated that the process 900 described below is merely exemplary and may include a fewer or greater number of steps, and that the order of at least some of the steps may vary from that described below.

The search process 900 begins by receiving input (block 904). In one embodiment, a user uploads the image through a web form. For example, if a user sees a painting that they like in a restaurant, the user can take a photo of the painting using their mobile phone, and upload the image to their computer and to the web form or directly to the web form to search for the painting. In another embodiment, the user can enter the URL where the image is located. In yet another embodiment, the user can use a browser plug-in or widget that allows the user to use a "Find Similar" function of the plug-in or widget to implement a search. Users can also use a system agent or computer widget that looks for specific images online (e.g., a widget that controls the use of intellectual property rights for a user-specified image). In addition, a third-party portal or online service can provides access to the search functionality of the system for images on that portal. The user may also specify additional characteristics for search, such as color, image histogram, level of similarity, meta-tags, number of resulting images, and the like.

The process 900 continues by calculating a metric for the input (block 908). For example, the input image can be analyzed to generate a query image index file and a cluster identifier as described above. The process 900 continues by comparing the input metric with stored cluster metrics (block 912) and identifying a cluster that matches the image (block 916). For example, the image index file or cluster identifier may be compared with the cluster identifier for each cluster using a mathematical formula, such as described above with reference to FIG. 6. The cluster that most closely corresponds to the image index file is selected for additional comparison.

The process 900 continues by comparing the input metric with the stored image metrics in the matching cluster (block 920). The index file of the input image is then compared with the index files of each image in the index data store. A similarity score may be generated for each image using, for example, the formula described above with reference to FIG. 6. The process 900 continues by ranking stored metrics and generating search results (block 924). For example, a web page that includes a list of images with thumbnails of the images may be generated that lists the images with the image corresponding to the highest similarity score at the top and lists additional images in descending order corresponding to the similarity score. The process 900 continues by transmitting search results corresponding to the receive input (block 928). For example, the web page may be presented to the user.

Figure 10:
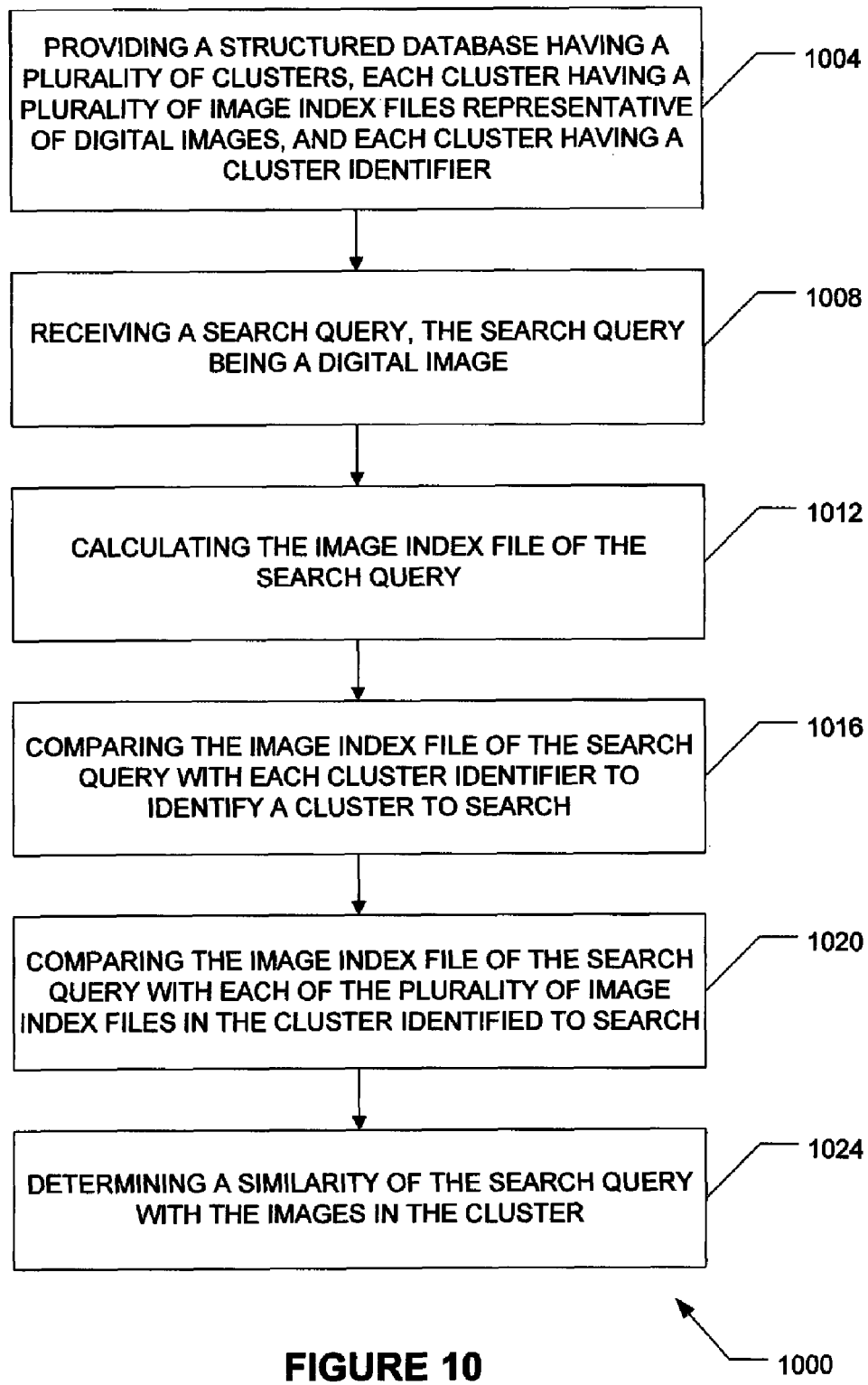
FIG. 10 is a detailed flow diagram of a process for image searching in accordance with one embodiment of the invention.

FIG. 10 illustrates a search process 1000 according to another embodiment of the invention. It will be appreciated that the process 1000 described below is merely exemplary and may include a fewer or greater number of steps, and that the order of at least some of the steps may vary from that described below.

The search process 1000 begins by providing a structured database having a plurality of clusters, each cluster having a plurality of image index files representative of digital images, and each cluster having a cluster identifier (block 1004). For example, the indexing data store 212 of FIG. 2 and indexing database 316 of FIG. 3 that is generated according to the processes of FIG. 7 or 8 is provided for searching.

The process 1000 continues by receiving a search query, the search query being a digital image (block 1008). The process 1000 continues by calculating the image index file of the search query (block 1012). For example, the input image can be analyzed to generate a query image index file and a cluster identifier as described above.

The process 1000 continues by comparing the image index file of the search query with each cluster identifier to identify a cluster to search (block 1016) and comparing the image index file of the search query with each of the plurality of image index files in the cluster identified to search (block 1020). A similarity score may be generated for each cluster using, for example, the formula described above with reference to FIG. 6. The process 1000 continues by determining a similarity of the search query with the images in the cluster (block 1024). A similarity score may generated for each image using, for example, the formula described above with reference to FIG. 6.

Embodiments of the invention can be used to deliver advertisements by comparing advertisement images with other images accessed or searched by a user. This allows advertisers the ability to show their marketing message on a user's search result page that is relevant to content of that the user was searching. In addition, media assets that are similar to one provided by user can be located, and concepts that describe the located media assets can be determined. As a result, advertising that is the most relevant to the media asset provided by user can be identified. This allows advertisers the ability to show their marketing message on the page shown to user that is relevant to the content of the media asset that user is looking for. For example, if the user searched for an image of a place of interest, a travel offer for that destination or a destination having similar characteristics can be offered to the user. In another example, if the user is searching sites or information that has a "Christmas" theme, the advertisements for Coca-cola may be delivered to the user.

Figure 11:
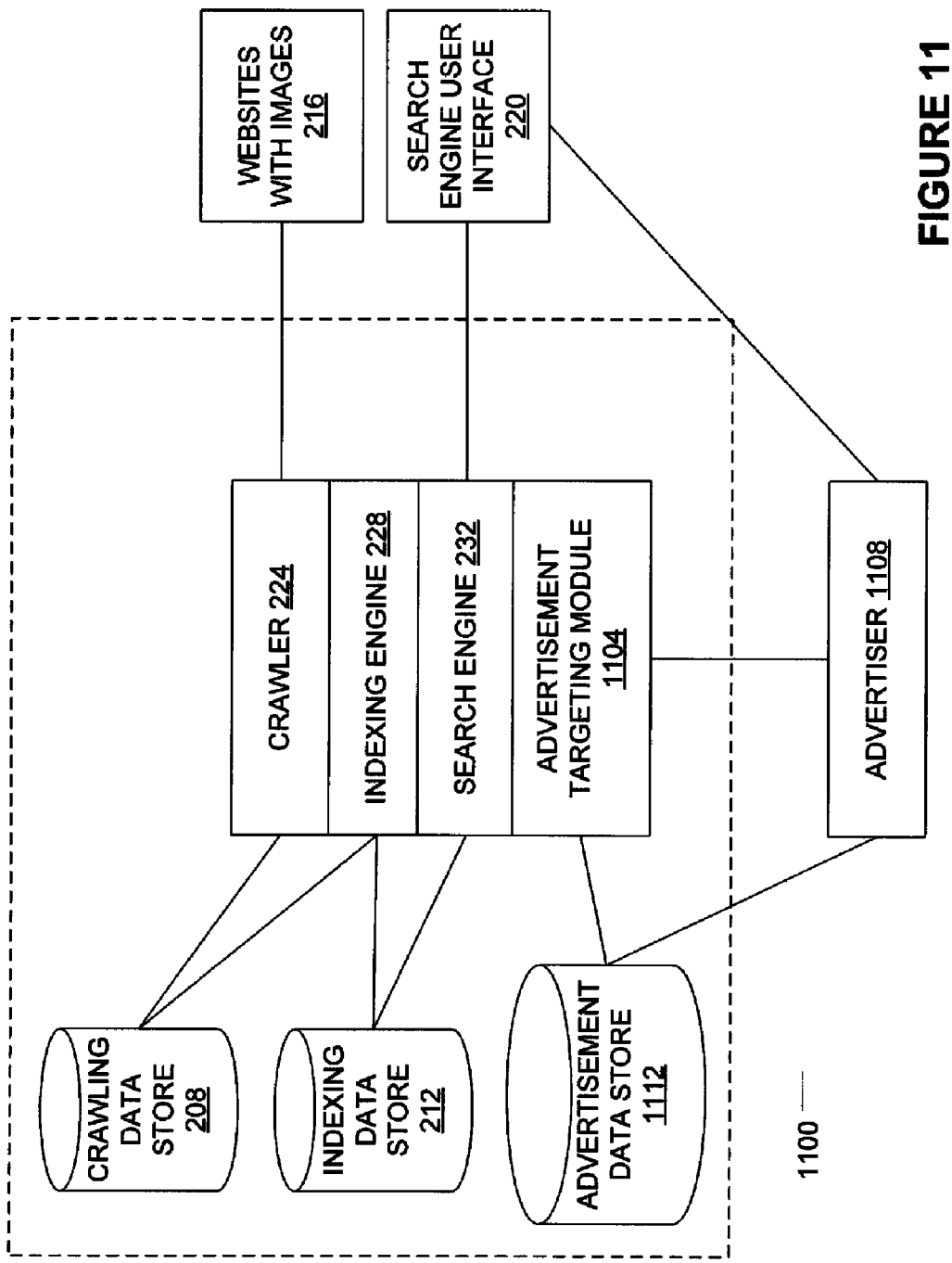
FIG. 11 is a block diagram of a search and advertisement system in accordance with one embodiment of the invention.

FIG. 11 illustrates an advertising image search system 1100. As shown in FIG. 11, the advertising image search system 1100 is similar to the search system 200 and includes the search server 204, the crawling data store 208 and the indexing data store 212. The search system 200 accesses the websites with images 216, and is connected to the search engine user interface 220. As shown in FIG. 11, the search server 204 includes the crawler 224, the indexing engine 228 and the search engine 232, and also includes an advertisement targeting module 1104. The advertisement targeting module 1104 is in communication with an advertiser 1108 and an advertisement data store 1112. The advertiser 1108 and the advertisement data store 1112 are also in communication with one another.

Advertisers upload their media files to the dedicated advertisement data store 1112. The system 1100 compares user images with those in the advertisement data store 1112 and builds a list of most relevant offerings. This list is submitted to the third party advertisement management system 1108 for processing in real time to deliver targeted advertising to the user.

In another embodiment, advertisers can provide concepts for their marketing message, which are stored in the advertisement data store 1112. The system 1100 can then find concepts based on the user media assets in the advertisement database 1112 and build a list of the most relevant offerings. The list is submitted to the advertisement management system 1108 for processing in real time to deliver targeted advertising.

Figure 12:
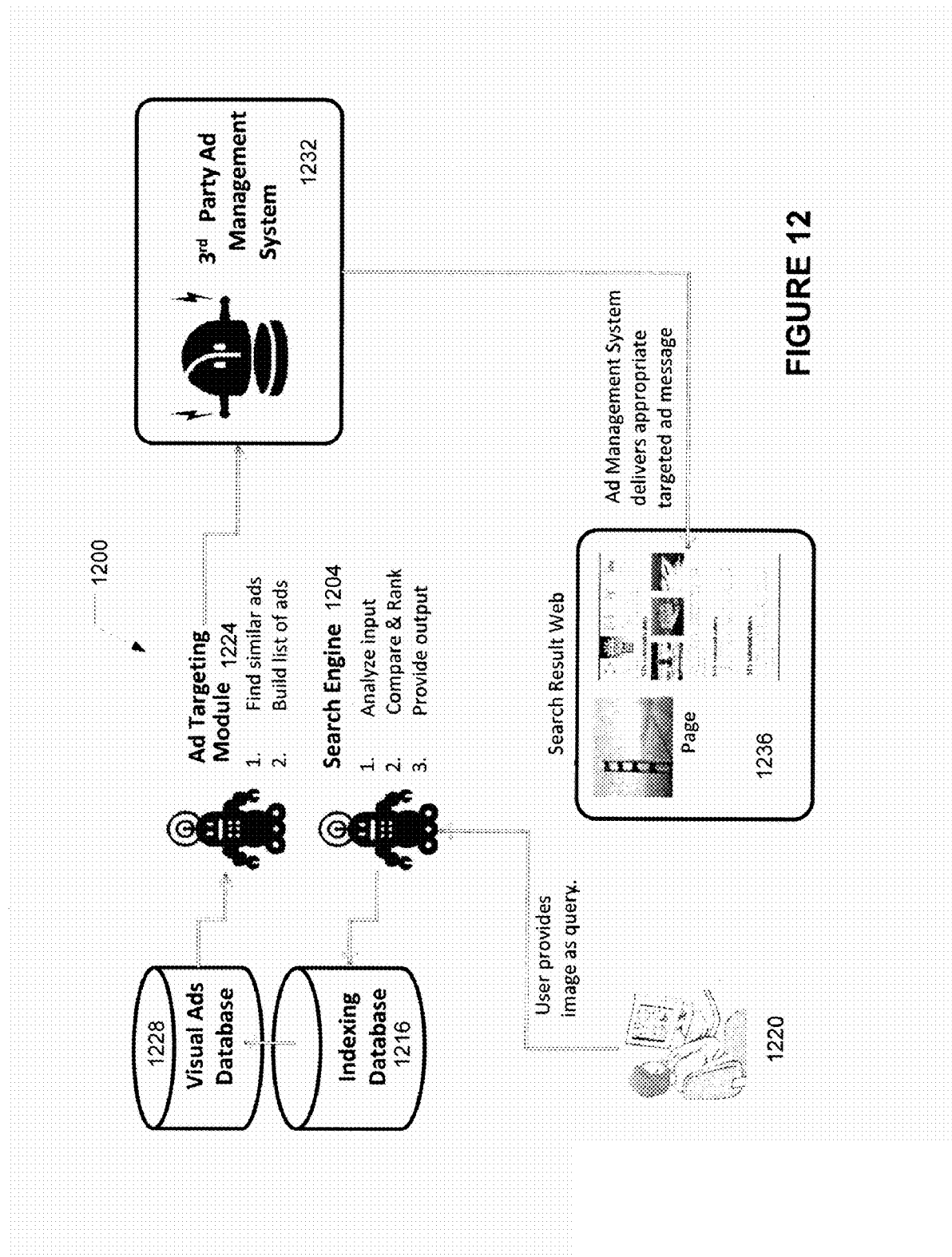
FIG. 12 is a flow diagram of a method for advertising using image comparison in accordance with one embodiment of the invention.

FIG. 12 illustrates the advertisement system and a process for delivering targeted advertisements using the advertisement system 1200. The system 1200 includes a search engine 1204, an indexing database 1216, a search portal 1220, an ad targeting module 1224, a visual advertisement database 1228, and a third party advertisement management system 1232.

As shown in FIG. 12, the method includes the user providing am image as a query to the search engine 1204 from the search portal 1220. The search engine 1204 analyzes the input, compares and ranks the input and provides output as described above using the indexing database 1216. The advertisement targeting module 1224 also finds similar advertisements using the visual advertisements database 1228 and the same methods described above and builds a list of advertisements. The advertisement targeting module 1224 provides the list of advertisements to the third party advertisement management system 1232 which delivers an appropriate targeted advertisement message for the search result page 1326. The search result page 1236 includes the search results identified by the search engine 1204 and the advertisements provided by the third party advertisement management system 1232.

Figure 13:
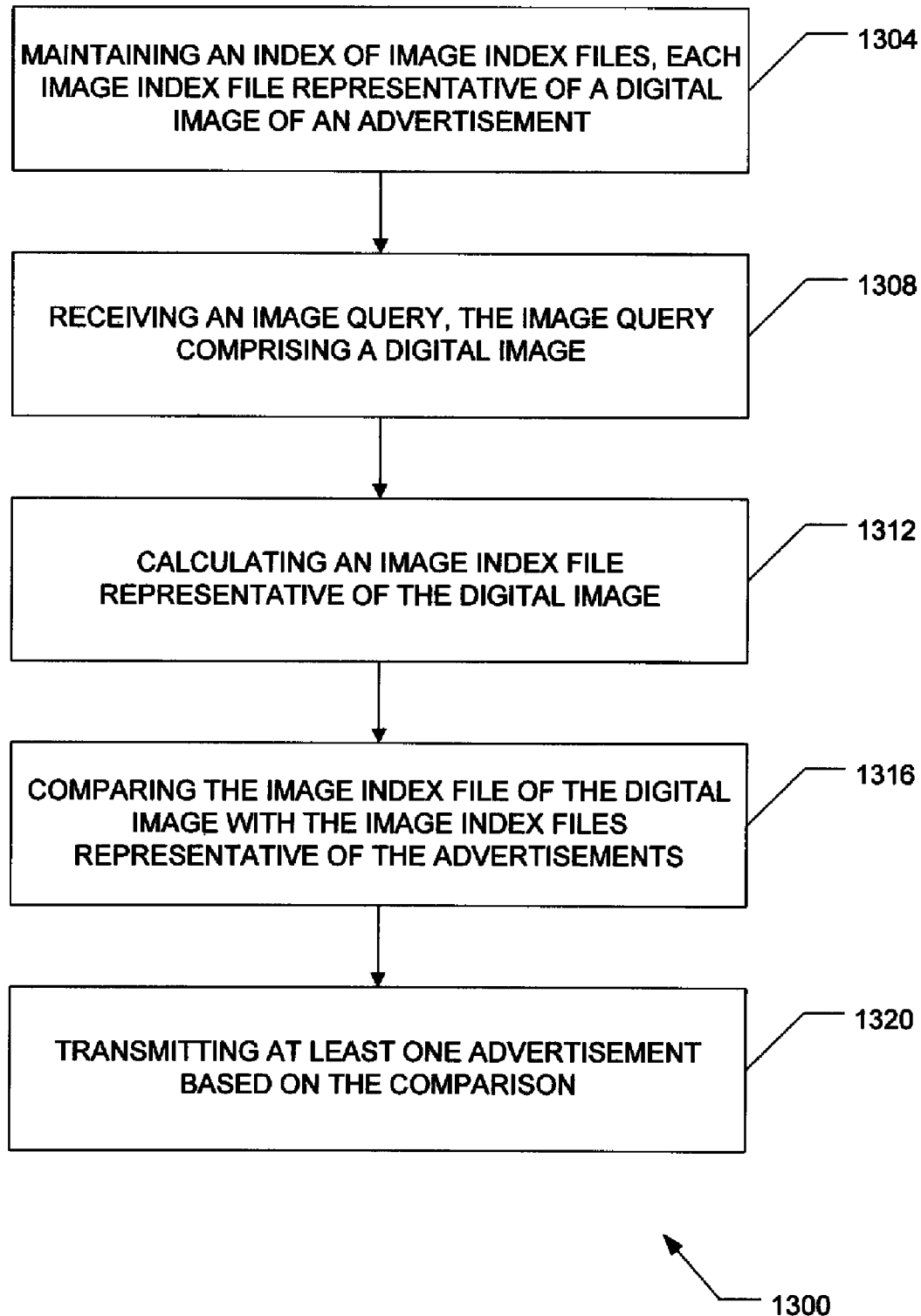
FIG. 13 is a flow diagram of a method for advertising using image comparison in accordance with one embodiment of the invention.

FIG. 13 illustrates an advertising process 1300 according to one embodiment of the invention. It will be appreciated that the process 1300 described below is merely exemplary and may include a fewer or greater number of steps, and that the order of at least some of the steps may vary from that described below.

The advertising process 1300 begins by maintaining an index of image index files, each image index file representative of a digital image of an advertisement (block 1304).

The advertising process 1300 continues by receiving an image query, the image query comprising a digital image (block 1308) and calculating an image index file representative of the digital image (block 1312).

The advertising process 1300 continues by comparing the image index file of the digital image with the image index files representative of the advertisements (block 1316) and transmitting at least one advertisement based on the comparison (block 1320).

Figure 14:
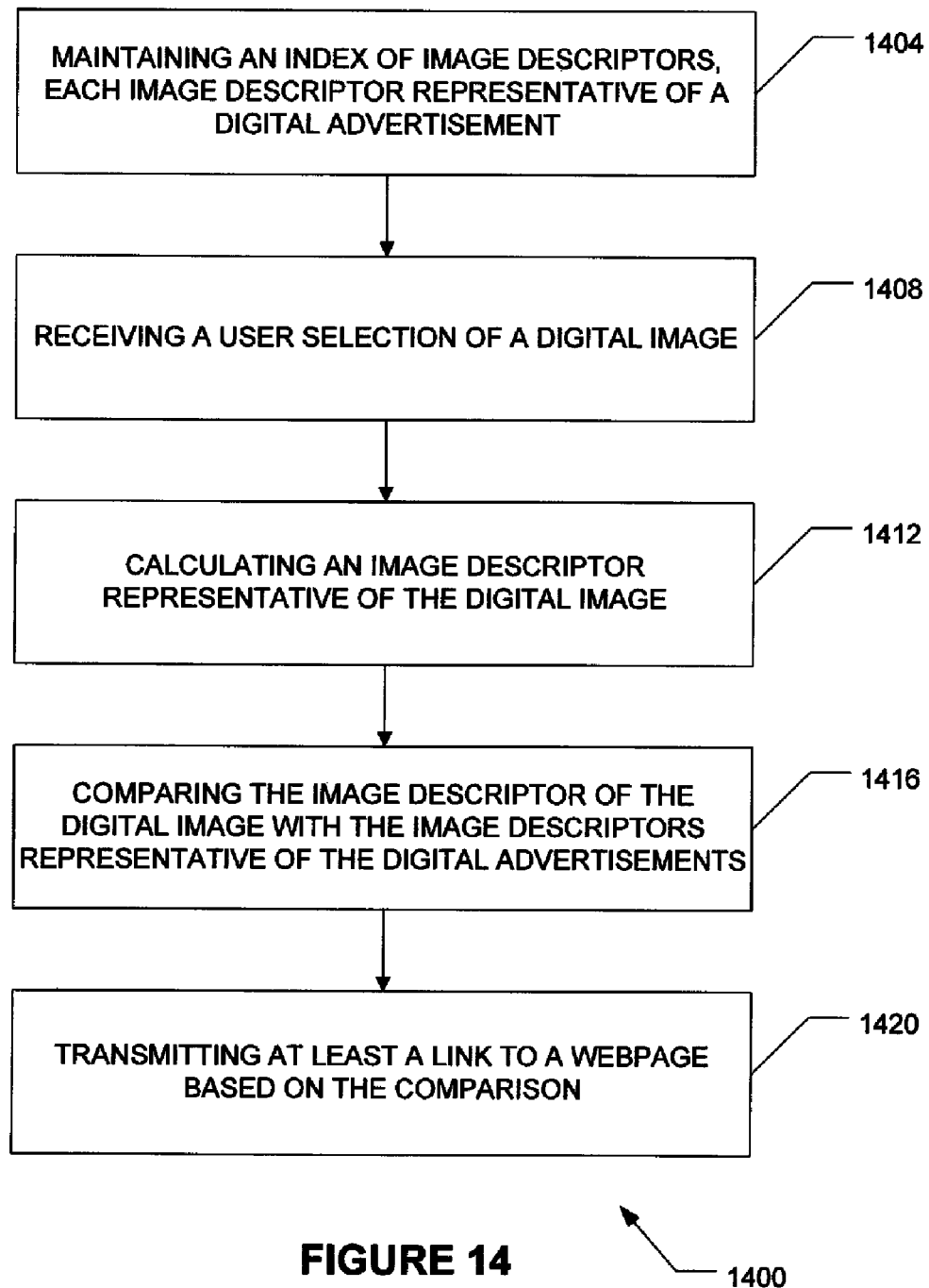
FIG. 14 is a flow diagram of a method for advertising using image comparison in accordance with one embodiment of the invention.

FIG. 14 illustrates an advertising process 1400 according to another embodiment of the invention. It will be appreciated that the process 1400 described below is merely exemplary and may include a fewer or greater number of steps, and that the order of at least some of the steps may vary from that described below.

The advertising process 1400 begins by maintaining an index of image descriptors, each image descriptor representative of a digital image of an advertisement (block 1304).

The advertising process 1400 continues by receiving user selection of a digital image (block 1408) and calculating an image descriptor representative of the digital image (block 1412).

The advertising process 1400 continues by comparing the image descriptor representative of the digital image with the image descriptors representative of the digital advertisements (block 1416) and transmitting at least a link to a webpage based on the comparison (block 1420).

Figure 15:
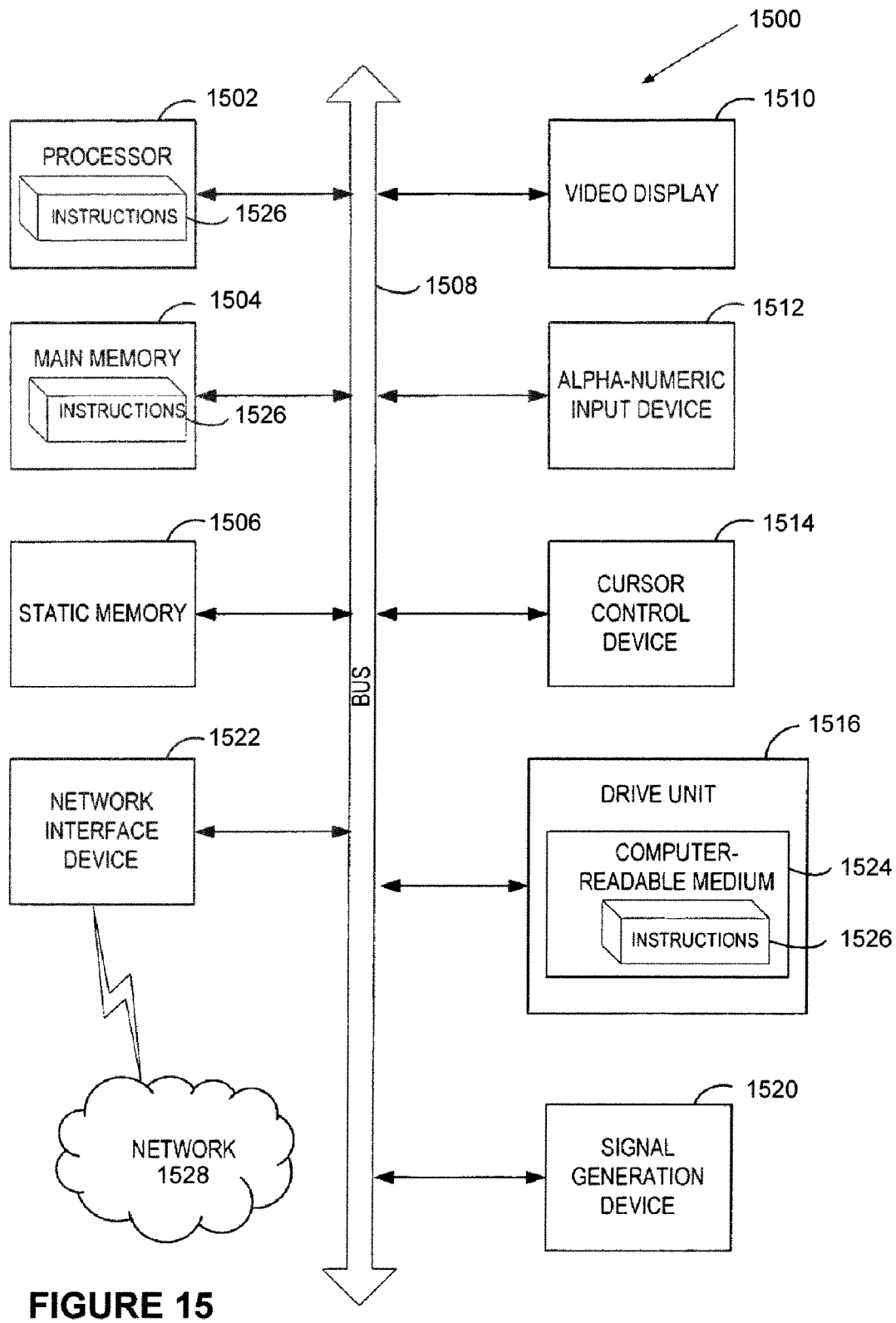
FIG. 15 is a block diagram of a computer in accordance with one embodiment of the invention.

FIG. 15 shows a diagrammatic representation of a machine in the exemplary form of a computer system 1500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server, personal computer (PC), a tablet PC, a set-top box (STB), a Personal Digital Assistant (PDA), a cellular telephone, a web appliance, a game console, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, the computer system 1500 of FIG. 15 is representative of the server 104 and/or computers 152 shown in FIG. 1.

The exemplary computer system 1500 includes a processor 1502 (e.g., a central processing unit (CPU), a graphics processing unit (GPU) or both), a main memory 1504 (e.g., read only memory (ROM), flash memory, dynamic random access memory (DRAM) such as synchronous DRAM (SDRAM) or Rambus DRAM (RDRAM), etc.) and a static memory 1506 (e.g., flash memory, static random access memory (SRAM), etc.), which communicate with each other via a bus 1508.

The computer system 1500 may further include a video display unit 1510 (e.g., a liquid crystal display (LCD) or a cathode ray tube (CRT)). The computer system 1500 also includes an alphanumeric input device 1512 (e.g., a keyboard), a cursor control device 1514 (e.g., a mouse), a disk drive unit 1516, a signal generation device 1520 (e.g., a speaker) and a network interface device 1522.

The disk drive unit 1516 includes a machine-readable medium 1524 on which is stored one or more sets of instructions (e.g., software 1526) embodying any one or more of the methodologies or functions described herein. The software 1526 may also reside, completely or at least partially, within the main memory 1504 and/or within the processor 1502 during execution of the software 1526 by the computer system 1500.

The software 1526 may further be transmitted or received over a network 1528 via the network interface device 1522.

While the machine-readable medium 1524 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Although the above process has been described with respect to a genetic algorithm, it will be appreciated that other optimization methods or combinations of optimization methods may be used to define the similarity between images and/or cluster images. Other exemplary optimization methods include hill climbing algorithms, maximizing mean fitness algorithms, ant algorithms, bacteriologic algorithms, cross-entropy algorithms, cultural algorithms, evolution algorithms, grouping genetic algorithms, harmony search algorithms, memetic algorithms, simulated annealing algorithms, stochastic algorithms and the like.

In the detailed description above numerous specific details were set forth in order to provide a thorough understanding of the present invention. However, it will be apparent to one skilled in the art that the present invention may be practiced without these specific details. In other instances, well-known structures and devices were shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read only memories (CD-ROMs), and magnetic-optical disks, read-only memories (ROMs), random access memories (RAMs), Erasable Programmable Read-Only Memories (EPROMs), Electrically Erasable Programmable Read-Only Memories (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein. The instructions of the programming language(s) may be executed by one or more processing devices (e.g., processors, controllers, control processing units (CPUs).

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A computer-implemented method comprising:
maintaining an index of image index files, each image index file being representative of a digital image of an advertisement and inclusive of a plurality of image metrics for multiple regions of the digital image of the advertisement;
receiving an image query, the image query comprising a digital image;
calculating an image index file representative of the digital image of the image query and inclusive of a plurality of image metrics for multiple regions of the digital image of the image query;
comparing the image index file inclusive of a plurality of image metrics for multiple regions of the digital image of the image query with the image index files, which are representative of the digital images of the advertisements and inclusive of a plurality of image metrics for multiple regions of the digital images of the advertisements;
transmitting at least one advertisement based on the comparison.

2. The computer-implemented method of claim 1, wherein comparing the image index file inclusive of a plurality of image metrics for multiple regions of the digital image of the image query with the index files representative of the digital images of the advertisements and inclusive of a plurality of image metrics for multiple regions of the digital images of the advertisements comprises generating a similarity score for each advertisement.

3. The computer-implemented method of claim 1 further comprising creating a list of advertisements based on the comparison.

4. The computer-implemented method of claim 3 further comprising transmitting the list of advertisements to a third party server, the third party server providing the digital images of the advertisements.

5. The computer-implemented method of claim 1 further comprising transmitting a request for the at least one advertisement to a third party server, the third party server providing the digital image of the at least one advertisement.

6. The computer-implemented method of claim 1, wherein the index further comprises a representation of the digital image of the advertisement.

7. The computer-implemented method of claim 1, wherein the digital image of the image query is submitted by a user, and wherein transmitting comprises transmitting the at least one advertisement to the user.

8. The computer-implemented method of claim 1, wherein the index further comprises a monosemantic descriptor for each image index file representative of a digital image of an advertisement, the method further comprising calculating a monosemantic descriptor for the digital image of the image query and comparing the monosemantic descriptor for the digital image of the image query with the monosemantic descriptors for the image index files representative of the digital images of the advertisements before comparing the image index file representative of the digital image of the image query with the image index files representative of the digital images of the advertisements.

9. The computer-implemented method of claim 8 wherein calculating the monosemantic descriptor comprises:
dividing the digital image into a plurality of cells;
calculating an image descriptor for each of the plurality of cells; and
aligning the image descriptor for each of the plurality of cells to calculate the monosemantic descriptor.

10. The computer-implemented method of claim 1, wherein the plurality of image metrics are clustered according to a color palette of the digital image, changes in image composition of the digital image and generic representation of the digital image.

11. The computer-implemented method of claim 1, wherein the plurality of metrics comprise color metrics, texture metrics, intensity metrics and morphology metrics.

12. The computer-implemented method of claim 1 wherein the plurality of metrics comprise a 2D color histogram and a 4D color vector field.

13. The computer-implemented method of claim 1 wherein comparing comprises calculating a similarity for each of the image metrics and summing the similarity to generate a similarity score.

14. The computer-implemented method of claim 1 wherein comparing comprises calculating the similarity for each of the image metrics, multiplying each of the similarities by a weighting factor, and summing the weighted similarities to generate an image similarity score.

15. A computer-implemented method comprising:
maintaining an index of image descriptors, each image descriptor representative of a digital advertisement and inclusive at least of a link to a webpage on which the digital advertisement is located;
receiving a user selection of a digital image;
calculating an image descriptor representative of the digital image of the user selection;
comparing the image descriptor of the digital image of the user selection with the image descriptors representative of corresponding digital advertisements and inclusive of at least the link to the webpage on which the corresponding digital advertisement is located;
transmitting at least the link to the webpage on which the digital advertisement is located based on the comparison.

16. The computer-implemented method of claim 15, wherein the user selection comprises a request to access the web-page on which the digital advertisement is located.

17. The computer-implemented method of claim 15, wherein the user selection is a mouse-over of the digital image.

18. The computer-implemented method of claim 15, wherein the user selection is a click-through of the digital image.

19. The computer-implemented method of claim 15, wherein comparing comprises generating a similarity score and wherein the link transmitted is based on the similarity score.

20. The computer-implemented method of claim 15 wherein the index further comprises a monosemantic descriptor representative of each digital advertisement, the method further comprising calculating a monosemantic descriptor for the digital image of the user selection and comparing the monosemantic descriptor for the digital image of the user selection with the monosemantic descriptors representative of the digital advertisements.

21. The computer-implemented method of claim 20, wherein calculating the monosemantic descriptor for the digital image of the user selection comprises:
- dividing the digital image of the user selection into a plurality of cells;
- calculating an image descriptor for each of the plurality of cells; and
- aligning the image descriptor for each of the plurality of cells to calculate the monosemantic descriptor.

22. The computer-implemented method of claim 15, wherein the index further comprises image index files, each image index file being representative of a digital image of an advertisement and comprising a plurality of image metrics for multiple regions of the digital image of an advertisement.

23. The computer-implemented method of claim 22, wherein the plurality of image metrics are clustered according to a color palette of the digital image, changed in image composition of the digital image and generic representation of the digital image.

24. The computer-implemented method of claim 22, wherein the plurality of image metrics comprise color metrics, texture metrics, intensity metrics and morphology metrics.

25. The computer-implemented method of claim 22, wherein the plurality of image metrics comprise a 2D color histogram and a 4D color vector field.

26. The computer-implemented method of claim 15 further comprising:
- in response to the user selection of the digital image, presenting the user with one or more referrals selected from the group consisting of purchasing a camera that took the digital image, buying a product or service from a source of the digital image, buying something related to the digital image, and getting more information about the digital image or the source of the digital image;
- receiving a user selection of one of the presented referrals; and
- transmitting at least the link to the webpage based on the similarity score and based on the selected referral type.

27. The computer-implemented method of claim 15, wherein transmitting at least the link to the webpage based on the similarity score further comprises transmitting the digital advertisement.

28. The computer-implemented method of claim 27 further comprising transmitting a request for the digital advertisement to a third party server, the third part server providing the digital image of the advertisement.

29. A computer system comprising:
- an index data store comprising a plurality of image index files, each image index file representative of a digital advertisement and inclusive of a plurality of image metrics for multiple regions of the digital advertisement;
- a search portal to receive a digital image; and
- an indexing engine to calculate the image index files inclusive of a plurality of image metrics for multiple regions of the digital advertisement for each digital advertisement, calculate an image index file inclusive of a plurality of image metrics for multiple regions of the received digital image and compare the image index file inclusive of a plurality of image metrics for multiple regions of the received digital image with the plurality of image index files representative of the digital advertisements and inclusive of a plurality of image metrics for multiple regions of the digital advertisements.

30. The computer system of claim 29 further comprising an advertisement data store to store the digital advertisements corresponding to the image index files inclusive of a plurality of image metrics for multiple regions of the digital advertisement in the index data store.

31. The computer system of claim 30 wherein the search portal is configured to transmit at least one of the digital advertisements in the advertisement data store based on the comparison by the indexing engine.

32. The computer system of claim 29 wherein the search portal further comprises a user interface.

* * * * *